(12) United States Patent
Kim et al.

(10) Patent No.: US 11,780,857 B2
(45) Date of Patent: Oct. 10, 2023

(54) PROBE COMPOUNDS FOR AMINO ALCOHOLS, AND SIMULTANEOUS FLUORESCENCE AND CIRCULAR DICHROISM ANALYSIS METHOD

(71) Applicant: EWHA UNIVERSITY—INDUSTRY COLLABORATION FOUNDATION, Seoul (KR)

(72) Inventors: Kwan Mook Kim, Seoul (KR); Juyoung Yoon, Seoul (KR); Eknath Shirbhate Mukesh, Seoul (KR); Ah-Young Song, Seoul (KR)

(73) Assignee: EWHA UNIVERSITY—INDUSTRY COLLABORATION FOUNDATION, Seoul (KR)

(*) Notice: Subject to any disclaimer, the term of this patent is extended or adjusted under 35 U.S.C. 154(b) by 540 days.

(21) Appl. No.: 16/852,039

(22) Filed: Apr. 17, 2020

(65) Prior Publication Data
US 2020/0347080 A1    Nov. 5, 2020

(30) Foreign Application Priority Data
Apr. 17, 2019  (KR) .................. 10-2019-0045155

(51) Int. Cl.
*C07F 5/02* (2006.01)
*G01N 21/19* (2006.01)
(Continued)

(52) U.S. Cl.
CPC .............. *C07F 5/025* (2013.01); *G01N 21/19* (2013.01); *G01N 21/6428* (2013.01);
(Continued)

(58) Field of Classification Search
CPC ........... C07F 5/025; Y10T 436/173845; G01N 21/19; G01N 21/6428; G01N 21/77;
(Continued)

(56) References Cited

U.S. PATENT DOCUMENTS

| | | | |
|---|---|---|---|
| 2012/0208819 A1* | 8/2012 | Arndt | C07D 417/14 |
| | | | 514/266.21 |
| 2014/0161729 A1* | 6/2014 | Barany | G01N 33/573 |
| | | | 544/137 |

FOREIGN PATENT DOCUMENTS

KR    10-2014-0098436 A    8/2014

OTHER PUBLICATIONS

Song, Ah-young. A borane sensor for amino alcohol to determine enantionmeric excess and concentration via circular dichroism and fluorescence [Master's thesis, Ewha Womans University]. <https://dspace.ewha.ac.kr/handle/2015.oak/249073> (Feb. 18, 2019) (Year: 2019).*

(Continued)

*Primary Examiner* — Jennifer Wecker
*Assistant Examiner* — Michelle Adams
(74) *Attorney, Agent, or Firm* — Greenberg Traurig, LLP

(57) ABSTRACT

The present disclosure relates to a novel probe compound, i.e., 1-(ortho-benzophenylaminoalkyl)-phenylboronic acid, or its derivative for a fluorescence and/or circular dichroism (CD) sensor for amine compounds containing aminoalcohols. Also, the present disclosure relates to a simultaneous fluorescence and CD analysis method of of amine compounds containing aminoalcohols using the novel probe compound to obtain concentration and optical purity of the amine compounds.

12 Claims, 25 Drawing Sheets

(51) Int. Cl.
  *G01N 21/64* (2006.01)
  *G01N 21/77* (2006.01)
(52) U.S. Cl.
  CPC ..... *G01N 21/77* (2013.01); *G01N 2021/6439* (2013.01); *G01N 2021/7786* (2013.01); *Y10T 436/173845* (2015.01)
(58) Field of Classification Search
  CPC ....... G01N 33/5005; G01N 2021/6439; G01N 2021/7786
  See application file for complete search history.

(56) References Cited

OTHER PUBLICATIONS

Shirbhate, M.-E. et al. "Optical and Fluorescent Dual Sensing of Aminoalcohols by in Situ Generation of BODIPY-like Chromophore," J. Am. Chem. Soc. 2020, 142, 4975-4979. Feb. 29, 2020 (Year: 2020).*

Raja, R.M. et al. "Lysine-Targeting Reversible Covalent Inhibitors with Long Residence Time," J. Am. Chem. Soc. 2022, 144, 1152-1157 (Year: 2022).*

Ah Young Song et al., "A Borane Sensor for Amino Alcohol to Determine Enantionmeric Excess and Concentration Via Circular Dichroism and Fluorescence", 121st General Meeting of the Korean Chemical Society, Apr. 18, 2018.

"A Simple Method for the Determination of Enantiomeric Excess and Identity of Chiral Carboxylic Acids" Joyce, L. A.; Maynor, M. S.; Dragna, J. M.; da Cruz, G. M.; Lynch, V. M.; Canary, J. W.; Eric V. Anslyn, E. V., J. Am. Chem. Soc. 2011, 133, 13726-13752.

"High-throughput screening of identity, enantiomeric excess, and concentration using MLCT transition in CD spectroscopy", Nieto, S.; Lynch, V, M,; Anslyn, E. V.; Kim, H.; Chin, J. J. Am. Chem. Soc. 2008, 130, 9232-9233.

Sungho Yoon, "Photo-induced Electron Transfer(PET) Based Luminescent Chemosensors Detecting Hazardous Substances", J. Kieeme vol. 25, No. 9, pp. 711-716, Sep. 25, 2012.

Guang-Yan Qing, "Highly Selective Fluorescent Recognition of Amino Alcohol Based on Chiral Calix[4]arenes Bearing L-tryptophan Unit", Journal Supramolecular Chemistry, vol. 20, 2008, Issue 7, pp. 635-641, Oct. 1, 2008.

Ah Young Song et al., "A Borane Sensor for Amino Alcohol to Determine Enantionmeric Excess and Concentration Via Circular Dichroism and Fluorescence", Master's Thesis at EWHA Womans University, Jan. 29, 2019, 51 pages.

* cited by examiner f1 (ppm)

f1 (ppm)

PROBE COMPOUNDS FOR AMINO ALCOHOLS, AND SIMULTANEOUS FLUORESCENCE AND CIRCULAR DICHROISM ANALYSIS METHOD

CROSS-REFERENCE TO RELATED APPLICATION

This application claims the benefit under 35 USC 119(a) of Korean Patent Applications No. 10-2019-0045155 filed on 04, 17, 2019 in the Korean Intellectual Property Office, the entire disclosures of which are incorporated herein by reference for all purposes.

TECHNICAL FIELD

The present disclosure relates to a novel probe compound, i.e., 1-(ortho-benzophenylaminoalkyl)-phenylboric acid, or its derivative for a fluorescence and/or circular dichroism (CD) sensor for amine compounds containing aminoalcohols. Also, the present disclosure relates to a simultaneous analysis method of fluorescence and CD of amine compounds containing aminoalcohols using the novel probe compound.

BACKGROUND

Amine compounds containing aminoalcohols constitute biomaterials and are widely used as ligands of asymmetric catalysts or as starting materials or intermediates necessary for synthesizing various pharmaceuticals and physiologically active substances, and thus, are compounds of great importance biologically and industrially.

High-performance liquid chromatography (HPLC) is a technique widely used to measure the optical purity of an amine compound containing aminoalcohols and has an advantage of precise measurement of purity but consumes a lot of time for measurement and uses an excessive amount of a mobile phase solvent and requires high cost for expensive equipment (Joyce, L. A.; Maynor, M. S.; Dragna, J. M.; da Cruz, G. M.; Lynch, V. M.; Canary, J. W.; Eric V. Anslyn, E. V., J. Am. Chem. Soc. 2011, 133, 13726-13752, "A Simple Method for the Determination of Enantiomeric Excess and Identity of Chiral Carboxylic Acids").

A chiral compound absorbs differently R-circularly polarized light (R-CPL) and L-circularly polarized light(L-CPL). A technique of measuring the type and purity of a chiral compound by measuring CD (Circular Dichroism) is lower in precision than the HPLC but consumes a shorter time for measurement and uses a smaller amount of a solvent and also uses cheaper equipment than the HPLC equipment and thus is advantageous for high-throughput screening (HTS) used to measure the type and purity of a chiral compound in a large number of samples in a short time. When efficient catalysts for chiralation are developed, short-time measurement is more needed even though the precision in chiral products is low. Therefore, it becomes more important to develop a technique for measuring the optical purity of a compound using the CD (Nieto, S.; Lynch, V, M; Anslyn, E. V.; Kim, H.; Chin, J., J. Am. Chem. Soc. 2008, 130, 9232-9233, "High-throughput screening of identity, enantiomeric excess, and concentration using MLCT transition in CD spectroscopy").

Most of amine compounds, such as aminoalcohols, do not have a chromophore and thus cannot generate a significant signal during CD measurement. For CD measurement of the compound, a probe that can be bonded to amine compounds, such as aminoalcohols, and shows color development in the UV-vis range is needed. The probe used for the CD measurement needs to construct a chiral structure by bonding to an amine substrate, such as aminoalcohol.

Even if there is a receptor that can generate a CD signal, the concentration of a substrate needs to be known to determine the optical purity. To know the concentration of a substrate, another receptor that can be bonded to the substrate and expresses fluorescence or involves a big change in the UV-vis range is needed. Therefore, to measure the optical purity of an amine compound, such as aminoalcohol, a probe that can generates the CD signal by bonding to the substrate and another probe that can make a big change to a UV-vis signal or fluorescence signal are needed. If a single receptor can generate a CD signal and a fluorescence signal at the same time, it will be a great advantage.

Until now, diarylnaphthalene, which is a fluorescence compound, has been known as a receptor that can generate a CD signal and a fluorescence signal for aminoalcohol at the same time.

[diarylnaphthalene]

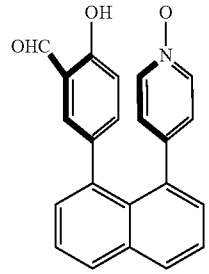

The compound forms an imine bond with an amine group of aminoalcohol, forms a hydrogen bond between an —OH group and an N—O group, makes a change to a fluorescence signal and also generates a CD signal depending on the placement of two aryl rings. However, the compound can easily react with general amine and has its own fluorescence, which makes it inconvenient to observe a change in fluorescence caused by substrate binding. Further, the hydrogen bond between an —OH group of the aminoalcohol and an N—O group of the receptor enhances the CD, which makes it difficult to observe a change in CD in a solvent in the presence of methanol or water.

SUMMARY

The present disclosure relates to a novel probe compound, i.e., 1-(ortho-benzophenylaminoalkyl)-phenylboric acid, or its derivative for a fluorescence and/or circular dichroism (CD) sensor for amine compounds containing aminoalcohols. Also, the present disclosure relates to a simultaneous analysis method of fluorescence and CD of amine compounds containing aminoalcohols using the novel probe compound.

However, problems to be solved by the present disclosure are not limited to the above-described problems. Although not described herein, other problems to be solved by the present disclosure can be clearly understood by a person with ordinary skill in the art from the following descriptions.

In accordance with a first aspect of the present disclosure, there is provided a compound represented by the following Chemical Formula 1 or its derivative:

[Chemical Formula 1]

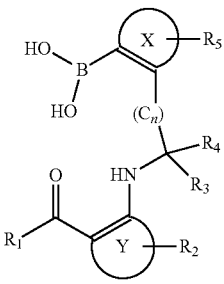

in the above Chemical Formula 1,
each of $R_1$, $R_2$, $R_3$, $R_4$, and $R_5$ is independently selected from the group consisting of hydrogen; a halogen; amino; nitro; cyano; formyl; carboxyl; and a $C_{1-10}$ alkyl, a $C_{1-10}$ alkylcarbonyl, a $C_{6-10}$ aryl, and a $C_{1-10}$ alkoxy substituted or not substituted with at least one substituent selected from the group consisting of a halogen, hydroxy, amino, cyano, nitro, and a $C_{1-10}$ aryl;
each of X and Y is independently a $C_{6-10}$ aryl group, or a $C_{2-10}$ heteroaryl group including at least one hetero atom selected from O, N, S, Si, and P; and
n is an integer of from 0 to 5.

In accordance of a second aspect of the present disclosure, there is provided a probe including the compound or its derivative according to the first aspect, wherein the probe is for measuring the concentration and optical purity of an amine compound containing aminoalcohol.

In accordance of a third aspect of the present disclosure, there is provided an analysis method, including measuring the concentration and optical purity of an amine compound containing aminoalcohol using the compound or its derivative according to the first aspect as a probe compound.

In an embodiment of the present disclosure, the probe compound forms an imine bond with an amino group contained in the amine compound and boron (B) contained in the probe compound connects a nitrogen (N) atom contained in the probe compound and a nitrogen (N) atom contained in the amine compound to form a fluorescence chromophore including an N—B—N bond-containing hetero ring in situ, and fluorescence and circular dichroism (CD) can be analyzed individually or simultaneously by using the fluorescence chromophore.

According to embodiments of the present disclosure, a novel probe compound including the compound represented by Chemical Formula 1, which is containing a carbonyl group (C=O), a boric acid group (—B(OH)$_2$) and an amine group, forms an imine bond with an amine compound containing aminoalcohol and simultaneously forms a bond to boron to form a fluorescence chromophore in situ and generate a circular dichroism (CD) signal depending on the chiral identity, and thus, it can be used as a novel probe compound for fluorescence and CD sensor for amine compounds containing aminoalcohols.

According to embodiments of the present disclosure, the novel probe compound can measure the chiral identity and optical purity (or enantiomeric excess) by CD.

According to embodiments of the present disclosure, the novel probe compound can react with the amine compound containing aminoalcohol at room temperature in a very short time to form a fluorescence chromophore.

BRIEF DESCRIPTION OF THE DRAWINGS

In the detailed description that follows, embodiments are described as illustrations only since various changes and modifications will become apparent to a person with ordinary skill in the art from the following detailed description. The use of the same reference numbers in different figures indicates similar or identical items.

DETAILED DESCRIPTION

Figure 1A:
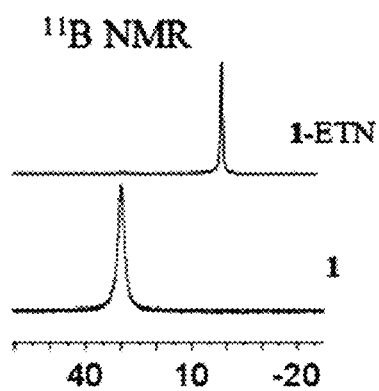
FIGS. 1A and 1B show $^{11}$B NMR change and $^{13}$C NMR change of before and after the addition of ethanolamine to compound 1.

Hereafter, embodiments and examples of the present disclosure will be described in detail with reference to the accompanying drawings so that the present disclosure may be readily implemented by a person with ordinary skill in the art. However, it is to be noted that the present disclosure is not limited to the embodiments and examples but can be embodied in various other ways. In the drawings, parts irrelevant to the description are omitted for the simplicity of explanation, and like reference numerals denote like parts through the whole document.

Throughout the whole document, the term "connected to" may be used to designate a connection or coupling of one element to another element and includes both an element being "directly connected to" another element and an element being "electronically connected to" another element via another element.

Through the whole document, the term "on" that is used to designate a position of one element with respect to another element includes both a case that the one element is adjacent to the other element and a case that any other element exists between these two elements.

Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added. The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for". Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "alkyl (group)" may individually include a linear or branched saturated or unsaturated $C_{1-20}$ alkyl (group), and may include, for embodiment, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, acosanyl, or all the possible isomers thereof, but may not be limited thereto.

Through the whole document, the term "alkenyl (group)" refers to a monovalent hydrocarbon group including at least one carbon-carbon double bond in an alkyl (group) having two or more carbon atoms among the above-described alkyl (group), and may include a linear or branched $C_{1-20}$ alkenyl (group), but may not be limited thereto.

Through the whole document, the term "alkynyl (group)" refers to a monovalent hydrocarbon group including at least one carbon-carbon triple bond in an alkyl (group) having two or more carbon atoms among the above-described alkyl (group), and may include a linear or branched $C_{2-20}$ alkynyl (group), but may not be limited thereto.

Through the whole document, the term "aryl (group)" refers to a monovalent functional group formed by the removal of one hydrogen atom from one or more rings of arene, and may include, for embodiment, phenyl, biphenyl, terphenyl, naphthyl, anthryl, phenanthryl, pyrenyl, or all the possible isomers thereof, but may not be limited thereto. The arene may refer to a hydrocarbon group having an aromatic ring, and includes monocyclic and polycyclic hydrocarbon groups. The polycyclic hydrocarbon group includes one or more aromatic rings and includes an aromatic or non-aromatic ring as an additional ring, but may not be limited thereto.

Through the whole document, the term "cycloalkyl (group)" refers to a monovalent functional group having a saturated hydrocarbon ring, and may include Ca cycloalkyl (groups), for embodiment, cyclopropyl, cylcobutyl, cyclopentyl, cyclohexyl, cycloheptyl, cyclooctyl, or all the possible isomers thereof, but may not be limited thereto.

Through the whole document, the term "alkoxy (group)" refers to the above-defined alkyl group connected to an oxygen atom, and may include a $C_{1-20}$ alkoxy group, and may include, for embodiment, methoxy, ethoxy, propoxy, butoxy, pentoxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, acosanyloxy, or all the possible isomers thereof, but may not be limited thereto.

Through the whole document, the term "halo group" refers to a halogen element from Group 17 of the periodic table included as a functional group in a compound, and the halogen element may include, for embodiment, F, Cl, Br, or I, but may not be limited thereto.

Through the whole document, the term "alkali metal" refers to a metal from Group I of the periodic table, and may include Li, Na, K, Rb, Cs, or Fr, but may not be limited thereto.

Hereinafter, embodiments and embodiments of the present disclosure will be described in detail with reference to the accompanying drawings. However, the present disclosure may not be limited to the following embodiments, embodiments, and drawings.

In accordance with a first aspect of the present disclosure, there is provided a compound represented by the following Chemical Formula 1 or its derivative:

[Chemical Formula 1]

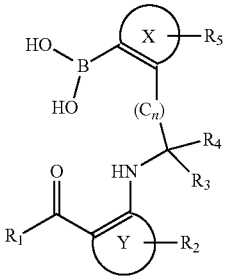

in the above Chemical Formula 1, each of $R_1$, $R_2$, $R_3$, $R_4$, and $R_5$ is independently selected from the group consisting of hydrogen; a halogen; amino; nitro; cyano; formyl; carboxyl; and a $C_{1-10}$ alkyl, a $C_{1-10}$ alkylcarbonyl, a $C_{6-10}$ aryl, and a $C_{1-10}$ alkoxy substituted or not substituted with at least one substituent selected from the group consisting of a halogen, hydroxy, amino, cyano, nitro, and a $C_{6-10}$ aryl;

each of X and Y is independently a $C_{6-10}$ aryl group, or a $C_{2-10}$ heteroaryl group including at least one hetero atom selected from O, N, S, Si, and P; and n is an integer of from 0 to 5.

In an embodiment of the present disclosure, the compound may be represented by the following Chemical Formula 2:

[Chemical Formula 2]

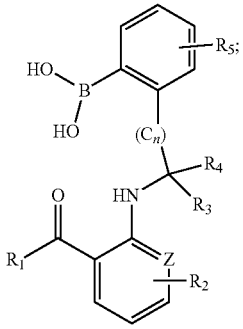

in the above Chemical Formula 2, each of $R_1$, $R_2$, $R_3$, $R_4$, and $R_5$ is independently selected from the group consisting of hydrogen; a halogen; amino; nitro; cyano; formyl; carboxyl; and a $C_{1-10}$ alkyl, a $C_{1-10}$ alkylcarbonyl, a $C_{6-10}$ aryl, and a $C_{1-10}$ alkoxy substituted or not substituted with at least one substituent selected from the group consisting of a halogen, hydroxy, amino, cyano, nitro, and a $C_{6-10}$ aryl;

Z is —N—, —O—, or —CH; and n is an integer of from 0 to 5.

In an embodiment of the present disclosure, the compound may be

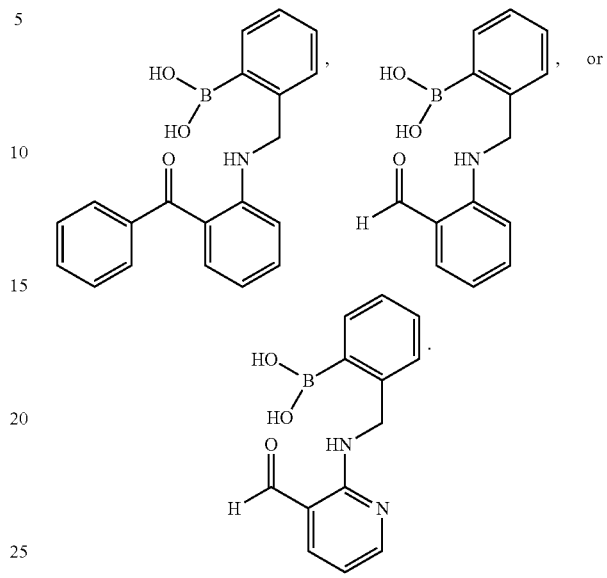

In an embodiment of the present disclosure, the compound may be [1-(ortho-benzophenylaminoalkyl)-phenylboric acid].

In accordance with a second aspect of the present disclosure, there is provided a probe including the compound or its derivative according to the first aspect, wherein the probe is for measuring the concentration and optical purity of an amine compound containing aminoalcohol.

In an embodiment of the present disclosure, the compound may be represented by the following Chemical Formula 2:

[Chemical Formula 2]

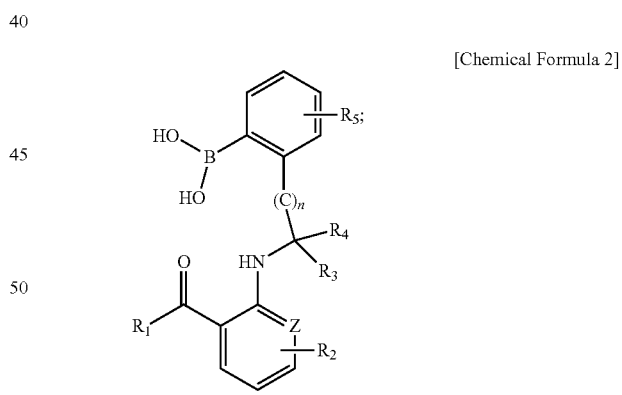

in the above Chemical Formula 2, each of $R_1$, $R_2$, $R_3$, $R_4$, and $R_5$ is independently selected from the group consisting of hydrogen; a halogen; amino; nitro; cyano; formyl; carboxyl; and a $C_{1-10}$ alkyl, a $C_{1-10}$ alkylcarbonyl, a $C_{6-10}$ aryl, and a $C_{1-10}$ alkoxy substituted or not substituted with at least one substituent selected from the group consisting of a halogen, hydroxy, amino, cyano, nitro, and a $C_{6-10}$ aryl;

Z is —N—, —O—, or —CH; and n is an integer of from 0 to 5.

In an embodiment of the present disclosure, the probe may be at least one selected from the group consisting of

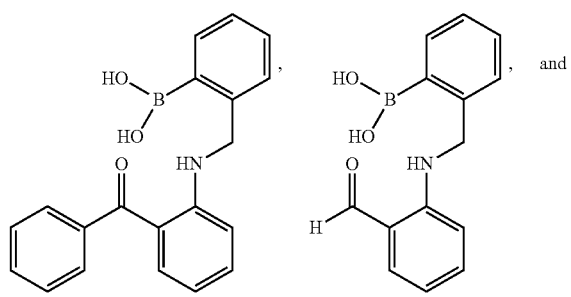
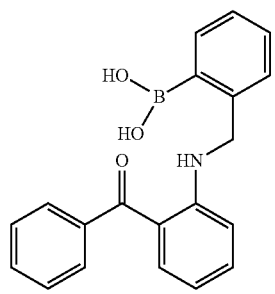

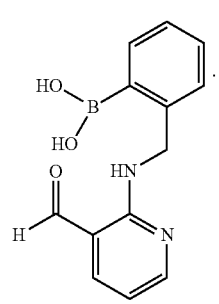

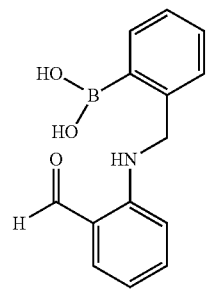

In an embodiment of the present disclosure, the probe may form an imine bond with an amino group contained in the amine compound and boron (B) contained in the compound and connect nitrogen (N) atom contained in the compound and nitrogen (N) atom contained in the amine compound to form a fluorescence chromophore including an N—B—N bond-containing hetero ring in-situ, and fluorescence and circular dichroism (CD) may be analyzed individually or simultaneously by using the fluorescence chromophore.

In accordance with a third aspect of the present disclosure, there is provided an analysis method, including measuring the concentration and optical purity of an amine compound containing aminoalcohol using the compound or its derivative of the first aspect of the present disclosure as a probe compound.

In an embodiment of the present disclosure, the probe compound may form an imine bond with an amino group contained in the amine compound and boron (B) contained in the compound and connect nitrogen (N) atom contained in the compound and nitrogen (N) atom contained in the amine compound to form a fluorescence chromophore including an N—B—N bond-containing hetero ring in-situ, and fluorescence and circular dichroism (CD) may be analyzed individually or simultaneously by using the fluorescence chromophore, but may not be limited thereto.

Hereinafter, the first to third aspects of the present disclosure will be described in more detail.

In an embodiment of the present disclosure, the compound or its derivative may include the following compound 1 [2-(((2-benzoylphenyl)amino)phenyl)boronic Acid], compound 2 and compound 3, but may not be limited thereto:

compound 1

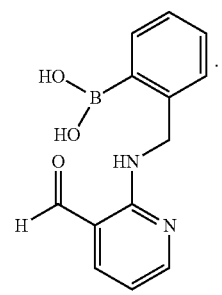

compound 2 compound 3

In an embodiment of the present disclosure, compound 1 may be synthesized by methods known in the art and may be synthesized by, for embodiments, a method as shown in the following Reaction Formula 1, but may not be limited thereto:

[Reaction Formula 1]

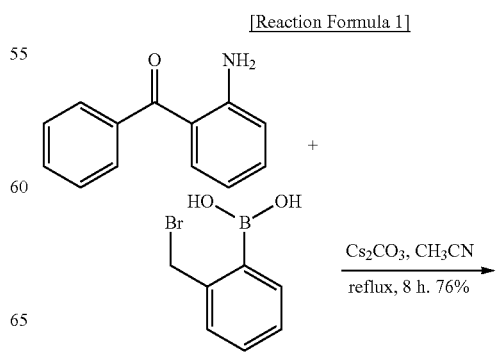

-continued

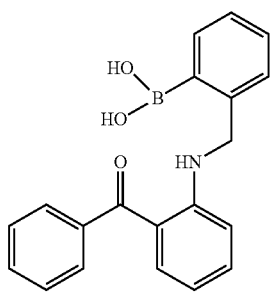

In an embodiment of the present disclosure, compound 2 may be synthesized by methods known in the art and may be synthesized by, for embodiment, a method as shown in the following Reaction Formula 2, but may not be limited thereto:

[Reaction Formula 2]

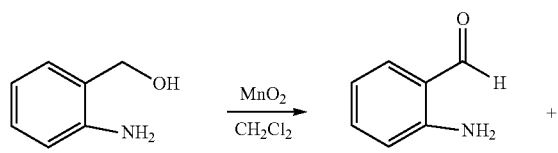

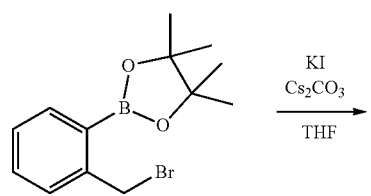

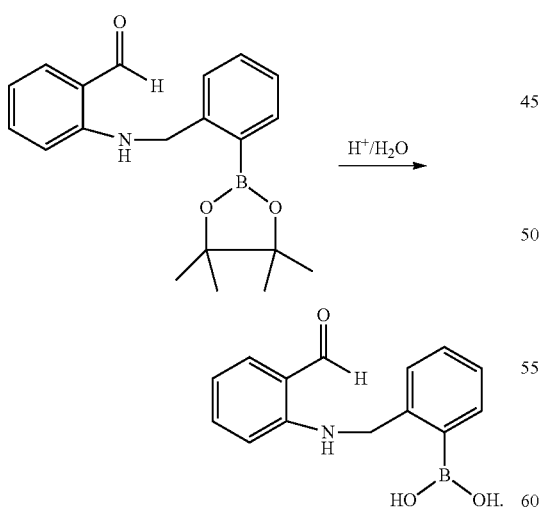

In an embodiment of the present disclosure, compound 3 may be synthesized by methods known in the art and may be synthesized by, for embodiment, a method as shown in the following Reaction Formula 3, but may not be limited thereto:

[Reaction Formula 3]

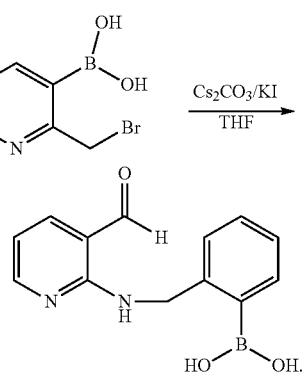

In an embodiment of the present disclosure, the amine compound including amino alcohol may be represented by the following Chemical Formula 3, but may not be limited thereto:

[Chemical Formula 3]

in the above Chemical Formula 3,
each of $R_5$, $R_6$, and $R_7$ is independently selected from the group consisting of hydrogen; a halogen; amino; nitro; cyano; formyl; carboxyl; and a $C_{1-10}$ alkyl, a $C_{1-10}$ alkylcarbonyl, a $C_{6-10}$ aryl, and a $C_{1-10}$ alkoxy substituted or not substituted with at least one substituent selected from the group consisting of a halogen, hydroxy, amino, cyano, nitro, and a $C_{6-10}$ aryl; and
m is an integer of from 0 to 5.

In an embodiment of the present disclosure, the amine compound may include the following aminoalcohol compounds, but may not be limited thereto:

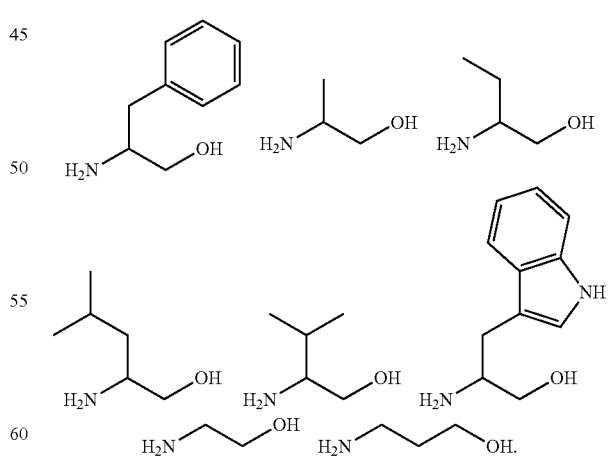

In an embodiment of the present disclosure, the compound, containing a carbonyl group (C=O), a boric acid group (—B(OH)$_2$) and an amine group, represented by Chemical Formula 1 may not have its own fluorescence chromophore, and thus, may not generate a fluorescence signal. Meanwhile, the compound may form an imine bond with the amine compound containing aminoalcohol to form an N—B—N bond-containing hetero ring as shown in the following Reaction Formula 4, and thus, can generate a fluorescence signal. For embodiments, compound 1, containing a carbonyl group (C=O), a boric acid group (—B(OH)$_2$) and an amine group, represented by Chemical Formula 1 may not have its own fluorescence chromophore, and thus, may not generate a fluorescence signal. However, compound 1 may form an imine bond with an amine compound containing aminoalcohol to form an N—B—N bond-containing hetero ring as shown in the following Reaction Formula 4 (FIG. 1A to FIG. 1C), and a fluorescence signal can be generated.

[Reaction Formula 4]

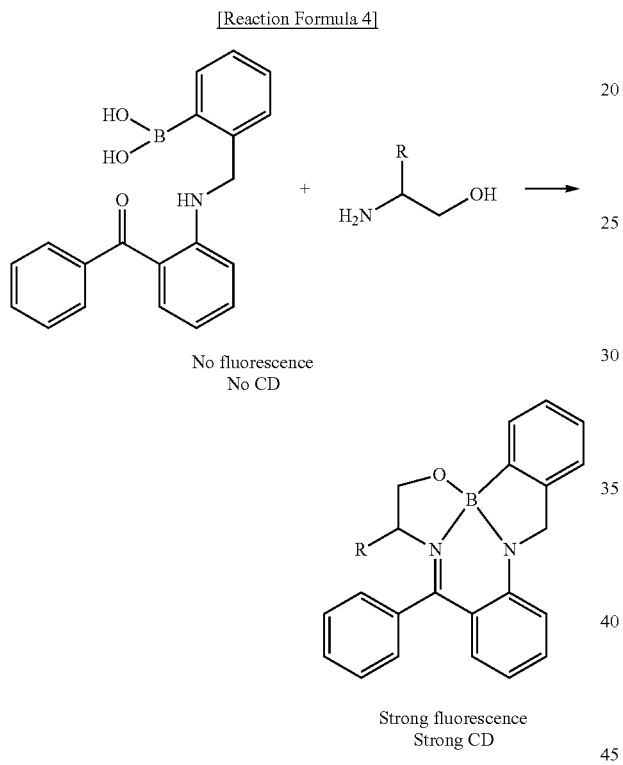

No fluorescence
No CD

Strong fluorescence
Strong CD

That is, compound 1, one of the compounds represented by Chemical Formula 1, may form an imine bond with aminoalcohol as shown in the above Reaction Formula 4 and boron connects N and N to form a fluorescence chromophore including an N—B—N bond-containing hetero ring, and thus, it is possible to generate a fluorescence signal. The generation of fluorescence from aminoalcohol in this way is novel and has not been reported before. That is, 1-(ortho-benzophenylaminoalkyl)-phenylboric acid represented by Chemical Formula 1 or its derivative has a carbonyl group (C=O) as a functional group that can react with various amine groups to form imine and also has a boric acid group (—B(OH)$_2$) for forming the imine.

In an embodiment of the present disclosure, a method for determining the optical purity and/or for detecting fluorescence using the novel probe compound may use fluorescence and/or CD, but may not be limited thereto.

In an embodiment of the present disclosure, a compound represented by the above Chemical Formula 1, such as compounds 1 to 3, does not have its own chiral identity, and thus, cannot show a CD signal, but forms an imine bond with an amine compound, such as aminoalcohol, having a chiral identity, and thus, can form an N—B—N bond-containing hetero ring and generate a CD signal (FIGS. 12A to 12F).

In an embodiment of the present disclosure, the compound represented by the above Chemical Formula 1, such as compounds 1 to 3, does not have its own chiral identity and thus cannot show a CD signal, but when reacting with aminoalcohol having a chiral identity, the compound forms a very strong ring, and thus, shows a strong CD signal. Further, aminoalcohols have different reactivities due to a difference in steric hindrance and have different three-dimensional structures, and thus, each aminoalcohol has a different CD shape (FIGS. 12 and 13). One of the great advantages of the compound represented by Chemical Formula 1 as a probe is that the type of aminoalcohol can be identified by the shape of CD.

Figure 5A:
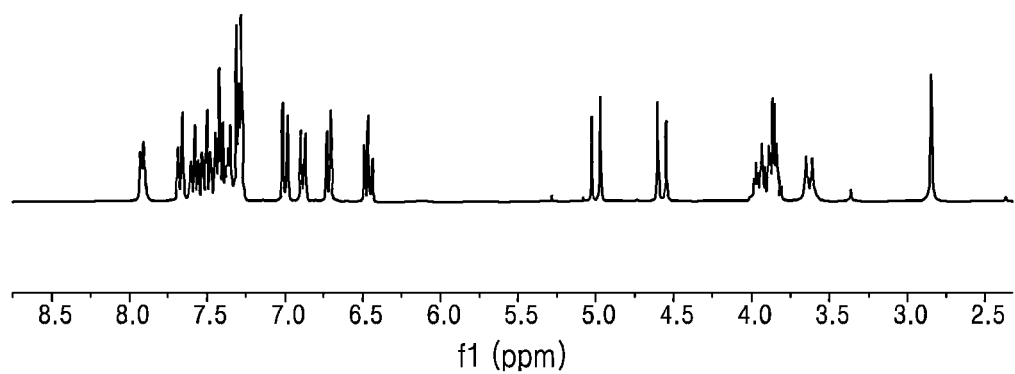
FIG. 5A shows $^1$H NMR of 1:1 adduct formation by reaction of compound 1 and ethanolamine
Figure 5B:
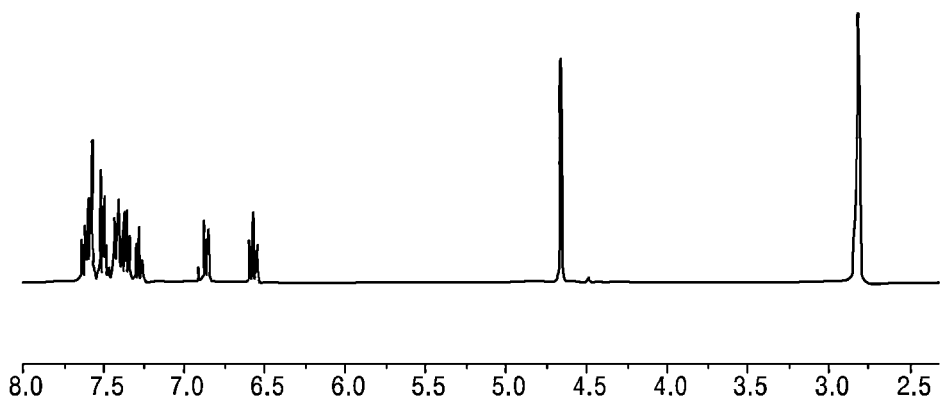
FIG. 5B shows $^1$H NMR of compound 1, in accordance with an example of the present disclosure.
Figure 6A:
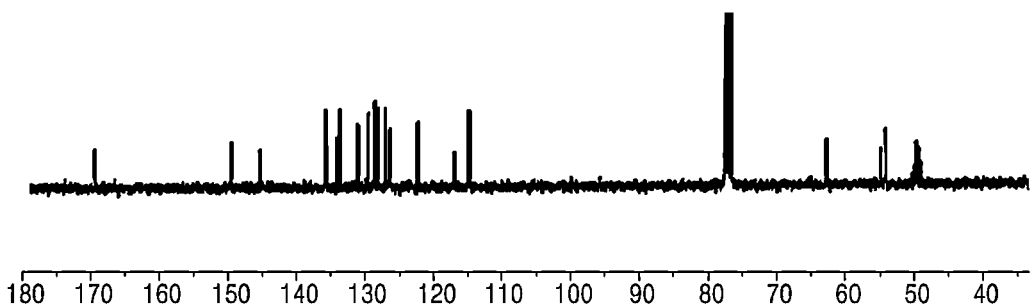
FIG. 6A shows $^{13}$C NMR of 1:1 adduct formation by reaction of compound 1 and ethanolamine
Figure 6B:
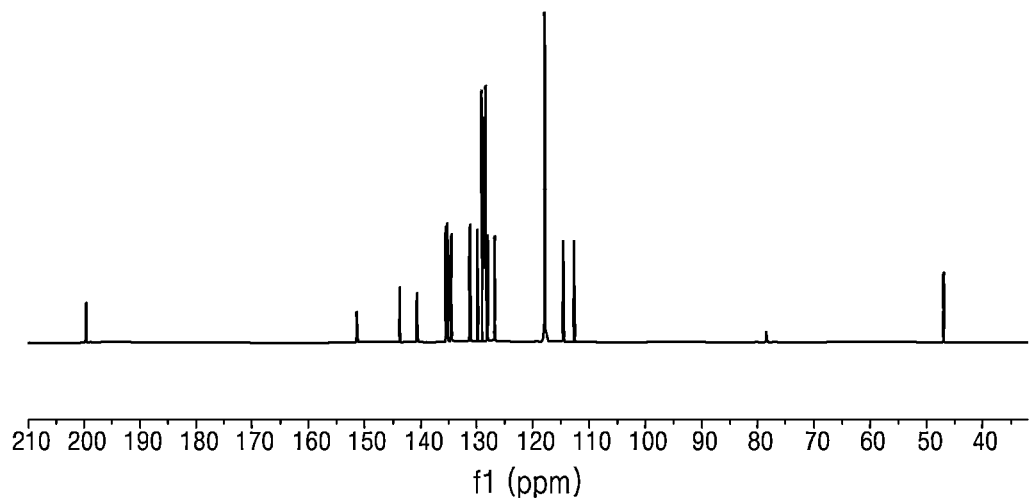
FIG. 6B shows $^{13}$C NMR of compound 1, in accordance with an example of the present disclosure.
Figure 7A:
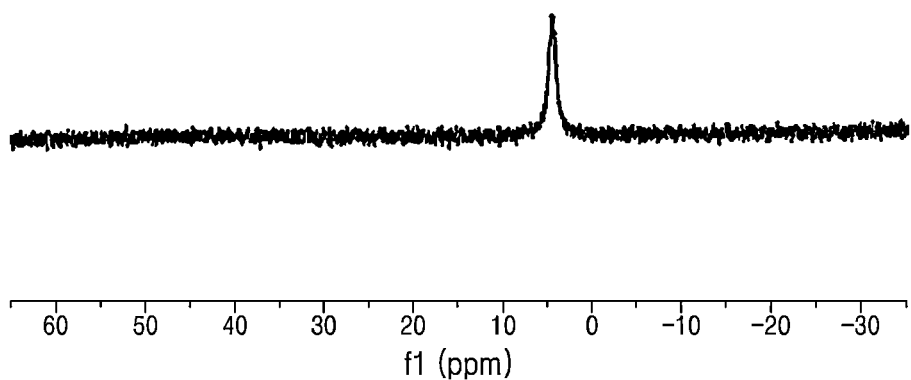
FIG. 7A shows $^{11}$B NMR of 1:1 adduct formation by reaction of compound 1 and ethanolamine
Figure 7B:
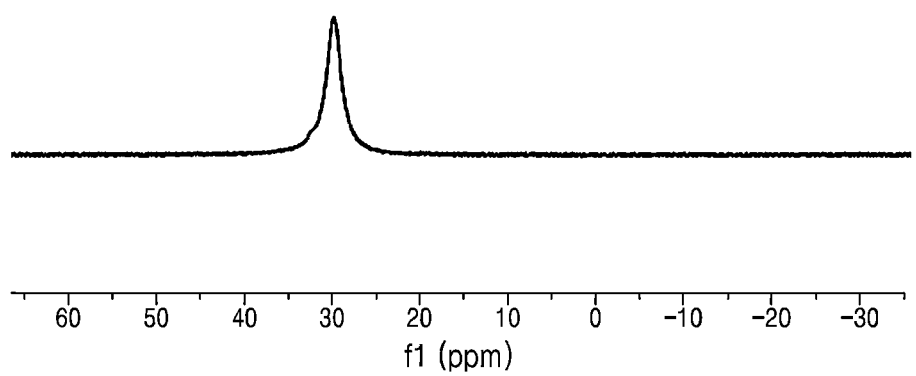
FIG. 7B shows $^{11}$B NMR of compound 1, in accordance with an example of the present disclosure.

In an embodiment of the present disclosure, a carbonyl group (C=O), a boric acid group (—B(OH)$_2$) and aminoalcohol of the compound represented by Chemical Formula 1 form an adduct having an N—B—N bond-containing hetero ring as shown in Reaction Formula 4, which can be predicted from HRMS data, $^{11}$B NMR, $^{1}$H NMR, and $^{13}$C NMR obtained from the reaction between the compound, such as Compound 1, represented by the above Chemical Formula 1 and ethanol amine (FIGS. 5 to 7).

Meanwhile, the following compounds 4 [(2-(benzylamino) phenyl)(phenyl)methanone] and 5 5 [1-(2-(((2-benzoylphenyl) amino) methyl) phenyl)-3-phenylurea], which are similar to compound 1 but do not have a boric acid group (—B(OH)$_2$), have a carbonyl group (C=O) but cannot react to form imine with aminoalcohol under normal room temperature conditions (FIG. 2), and thus, cannot generate a fluorescence signal or a CD signal. A uryl group of compound 5 has properties as a Lewis acid like a boric acid but cannot react with aminoalcohol. Therefore, it can be seen that the boric acid of Chemical Formula 1 plays a special role in forming imine and an N—B—N hetero ring.

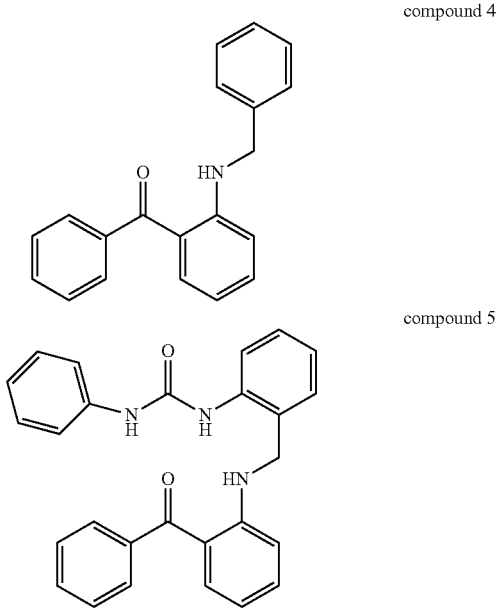

compound 4 compound 5

Also, the following compound 6 [(2-((naphthalen-1-ylamino) methyl) phenyl)boronic acid] has a fluorescence chromophore of a naphthylamine group, but fluorescence is quenched by an unshared electron pair present in N under normal conditions, and even in the presence of aminoalcohol compound 4 cannot make a significant change in fluorescence or CD. Therefore, it can be seen that the generation of fluorescence or CD by the compound represented by Chemical Formula 1, specifically, compounds 1 to 3, in the presence of aminoalcohol is closely related to the formation of an N—B—N hetero ring.

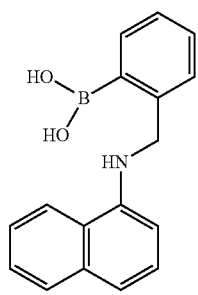

compound 6

In an embodiment of the present disclosure, compounds 1 to 3 do not form imine with amine that does not have an additional functional group, such as —OH or —NH, which can be bonded to boron. For example, compound 1 does not react with methylamine, ethylamine, phenylethylamine, and the like under normal room temperature conditions. As a result, compounds 1 to 3 can distinguish an amine compound that has an additional functional group, such as —OH or —NH, from an amine compound that does not have an additional functional group (Reaction Formula 5).

[Reaction Formula 5]

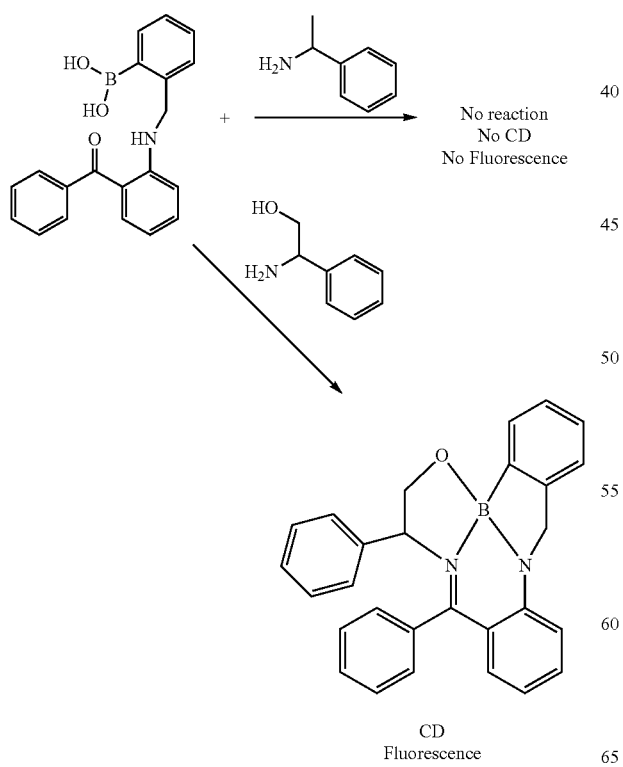

Figure 3A:
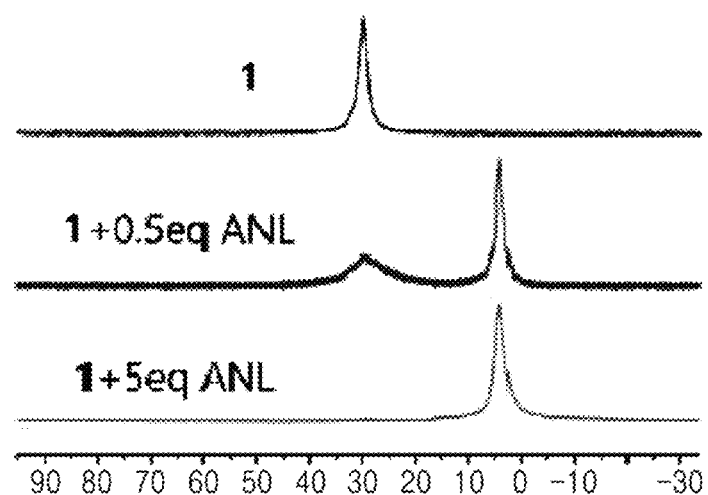
FIGS. 3A and 3B show $^{11}$B NMR change and $^{13}$C NMR change of before and after the addition of alaninol to compound 1.
Figure 3B:
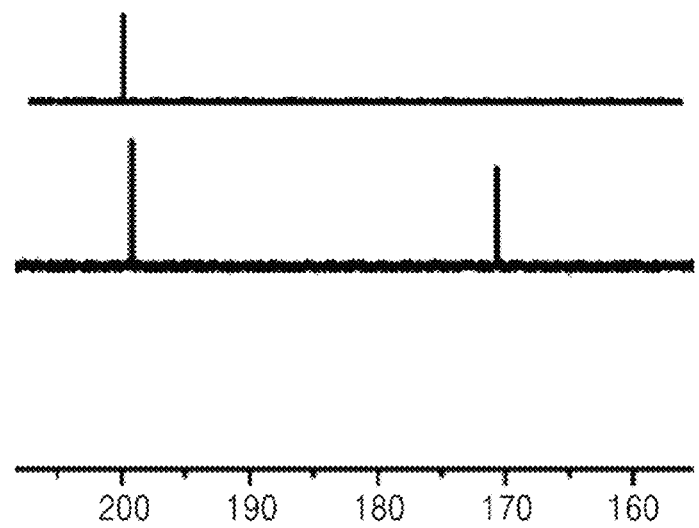
Figure 3C:
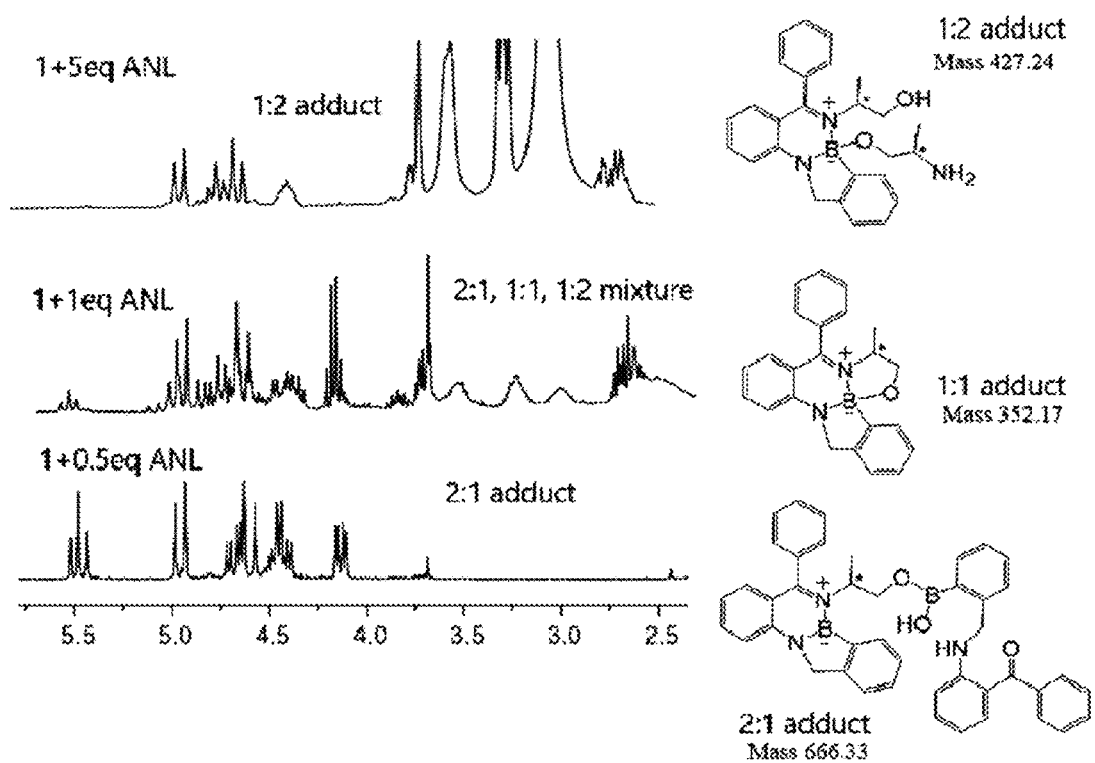
FIG. 3C shows $^1$H NMR and structures of products in cases of the addition of alaninol to compound 1, in accordance with an example of the present disclosure.

In an embodiment of the present disclosure, compounds 1 to 3 show a different reactivity depending on steric properties of carbon connected to an amine group. Ethanol amine does not have a steric hindrance, and thus, can form a 1:1 adduct with compound 1 in a very short time (FIGS. 5 to 7). Meanwhile, alaninol has a steric hindrance, and thus, forms a 2:1 (Compound 1: alaninol) adduct instead of a 1:1 adduct, and when the equivalent of alaninol increases, a 1:1 to 1:2 adduct is formed (FIG. 3). As a typical embodiment, 2:1 product, 1:1 product and 1:2 product according to the reaction of compound 1 and alaninol may be prepared as follows:

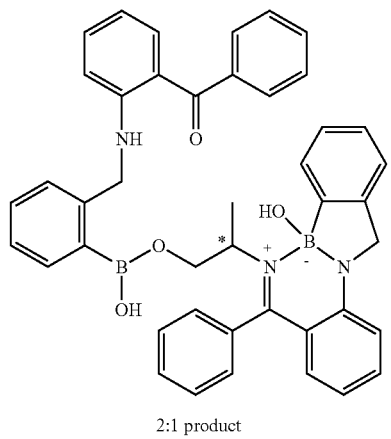

2:1 product

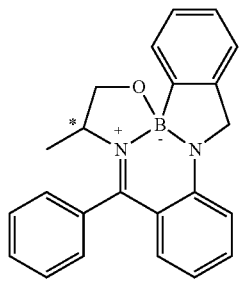 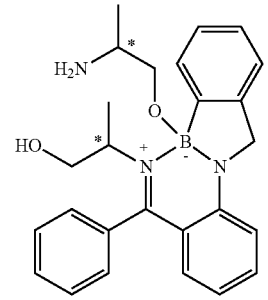

1:1 product          1:2 product

In an embodiment of the present disclosure, fluorescence is somewhat different for each kind of amine compound containing aminoalcohol, and particularly, a CD spectrum is remarkably different for each kind of aminoalcohol. This shows that if the compound represented by Chemical Formula 1, specifically, one of compounds 1 to 3, is used as a probe, it is possible to identify even the type of a substrate (Reaction Formula 6):

[Reaction Formula 6]
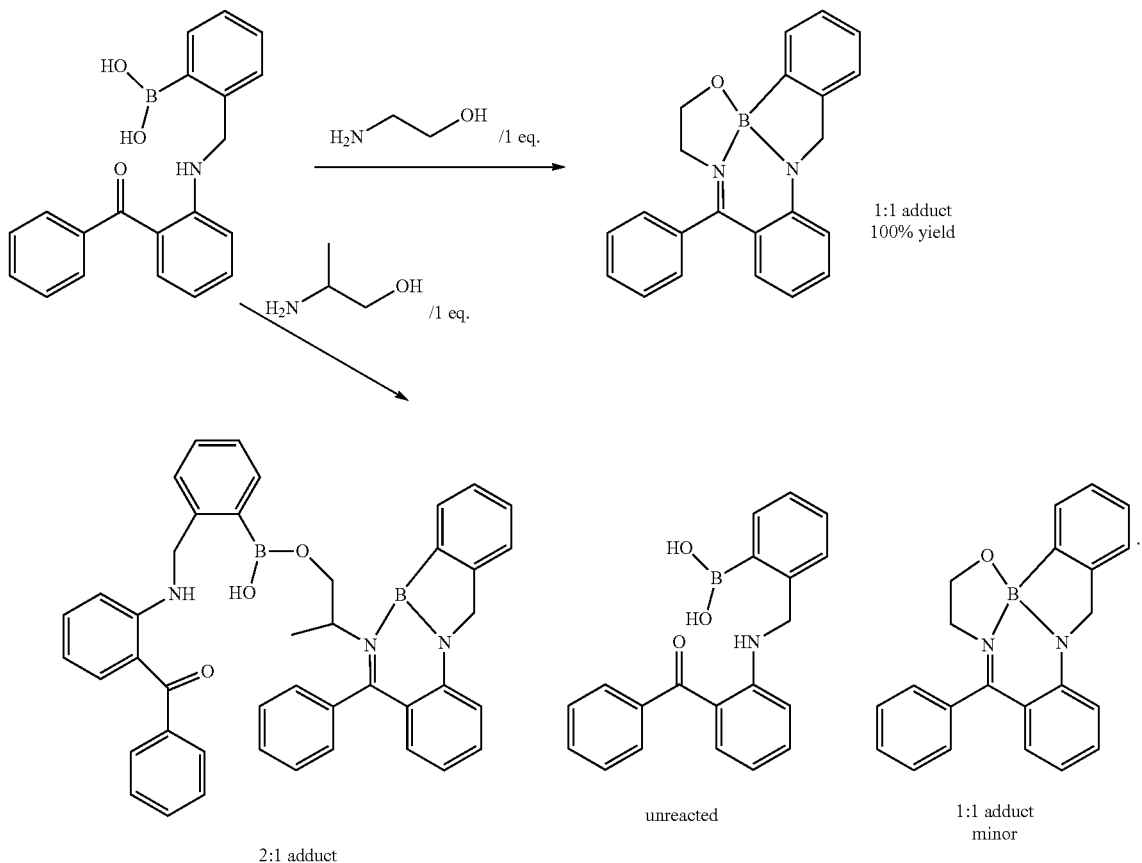
In an embodiment of the present disclosure, the compound represented by Chemical Formula 1 may react with the aminoalcohol in 2-steps, as a typical embodiment, the reaction of compound 1 and ethanol amine is carried out in 2-steps as Reaction Formula 7 to form a product:
[Reaction Formula 7]
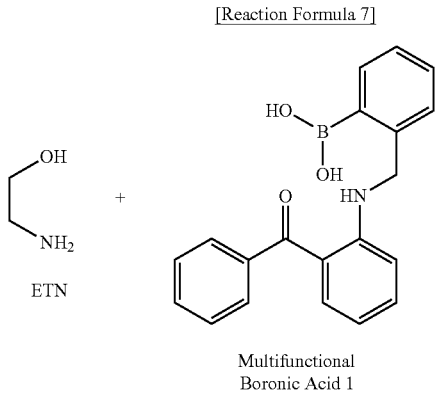
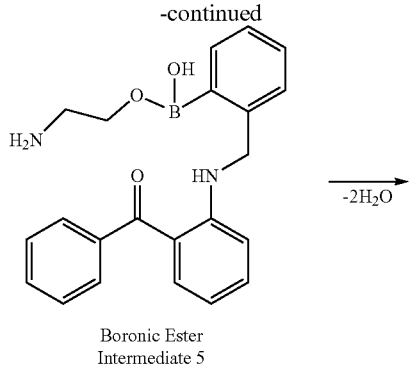

Figure 8A:
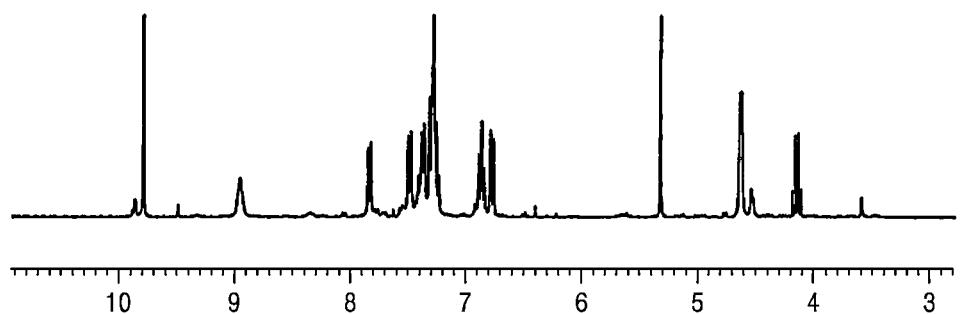
FIGS. 8A to 8C show $^1$H NMR spectra of CDCl$_3$ solutions of compound 2 (FIG. 8A), compound 2+alaninol (FIG. 8B), and compound 2+ethanolamine (FIG. 8C) respectively, in accordance with an example of the present disclosure.
Figure 8B:
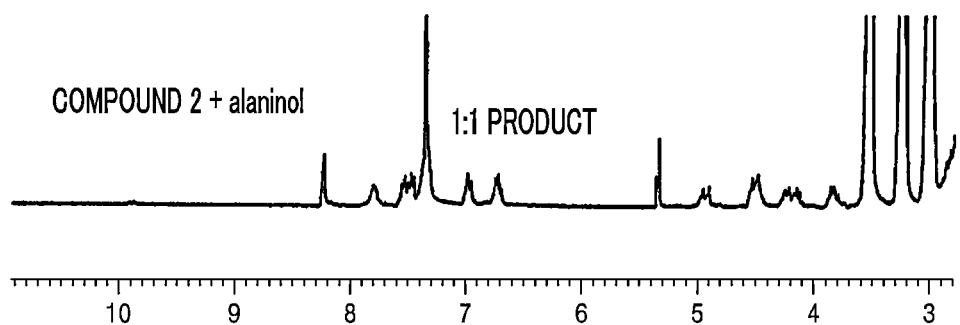
Figure 8C:
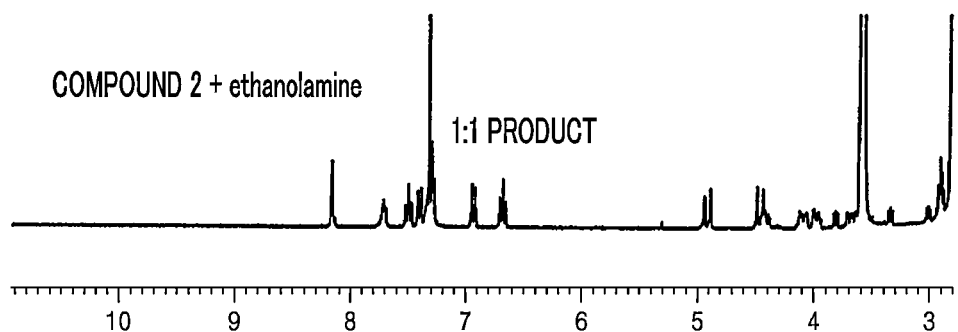
Figure 9A:
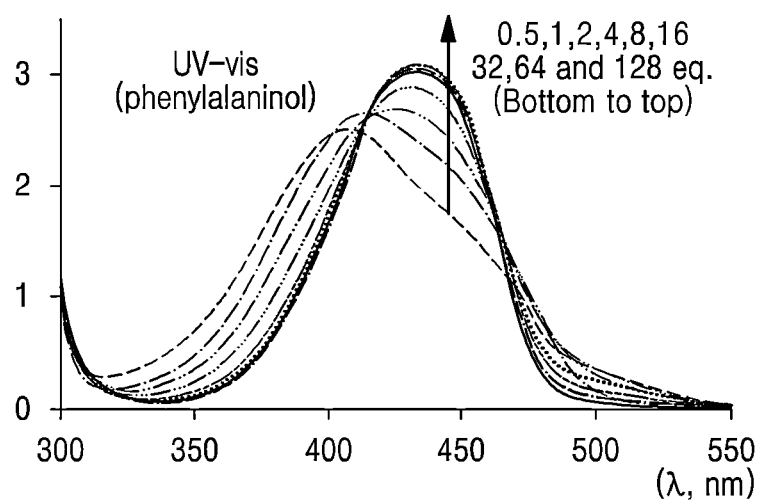
FIGS. 9A and 9B show UV-vis absorption change and logarithmic relationship at λ=450 nm according to the addition of PANL.
Figure 9B:
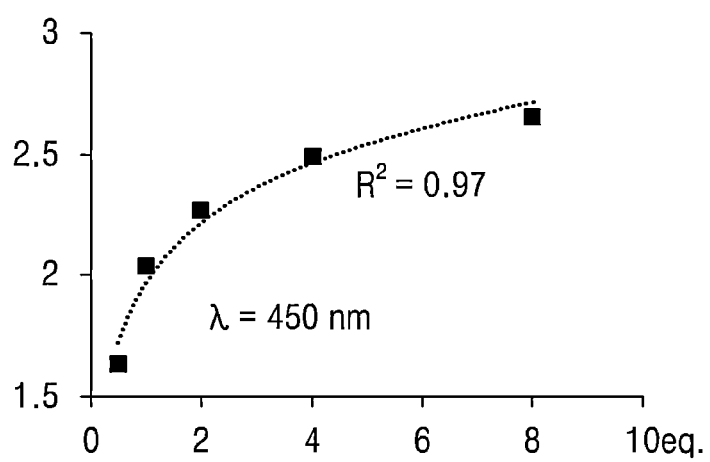
Figure 9C:
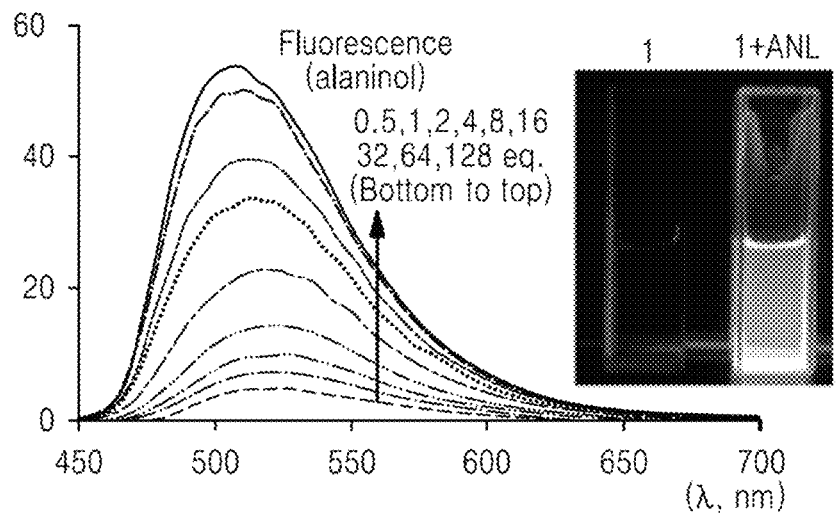
FIGS. 9C and 9D show fluorescence change and logarithmic relationship at λ=450 nm according to the addition of ANL, the concentration of compound 1 was 1.5 mM, and reactions were conducted in CH$_2$Cl$_2$, in accordance with an example of the present disclosure.
Figure 9D:
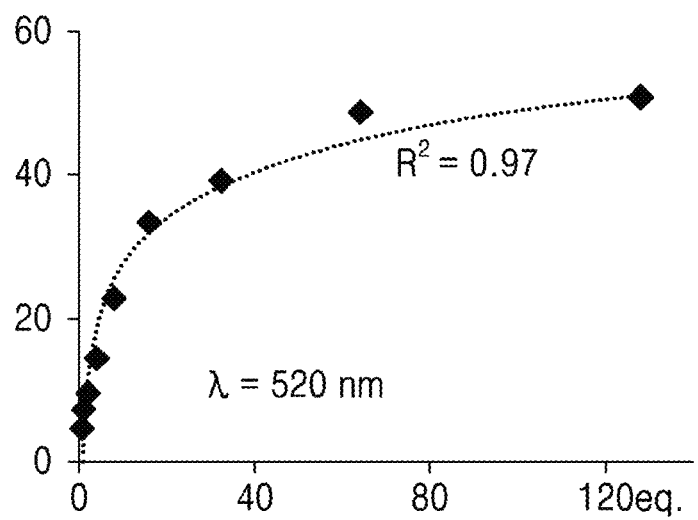

In an embodiment of the present disclosure, compounds 2 and 3 include aldehyde group so that their steric hindrances are not large compared to compound 1, and thus, compounds 2 and 3 can easily react with aminoalcohol. Referring to FIG. 8, it can be seen from the result of $^1$H NMR spectrum that compound 2 stably produces 1:1 product by reacting with not only ethanol amine but also alaninol.

In an embodiment of the present disclosure, the compound represented by Chemical Formula 1 may have its own fluorescence chromophore of very weak intensity, but reacts with an amine compound containing aminoalcohol to form a strong fluorescence chromophore. As a result, there is a great difference in the intensity of fluorescence between in the presence and absence of aminoalcohol within the amine compound. Therefore, this result shows that the compound represented by Chemical Formula 1 is very useful as a fluorescence sensor.

In an embodiment of the present disclosure, the compound represented by Chemical Formula 1 generates fluorescence in the presence of aminoalcohol. Therefore, it is possible to measure the concentration of the amine compound containing aminoalcohol. The concentration of the amine compound needs to be known to measure the optical purity of aminoalcohol in the amine compound by means of CD. The compound represented by Chemical Formula 1 can find the concentration using fluorescence and thus can be a very useful probe.

In an embodiment of the present disclosure, the compound represented by Chemical Formula 1 or its derivative expresses fluorescence in the presence of aminoalcohol.

In an embodiment of the present disclosure, the compound represented by Chemical Formula 1 or its derivative expresses a CD signal in the presence of optically active aminoalcohol.

In an embodiment of the present disclosure, the compound represented by Chemical Formula 1 or its derivative can measure the optical purity of the aminoalcohol, and specifically, the optical purity can be measured using CD signal and fluorescence signal of product (adduct) produced by mixing the compound represented by Chemical Formula 1 and aminoalcohol In an embodiment of the present disclosure, a substrate that can generate each or both of a CD signal and a fluorescence signal by reacting with the compound represented by Chemical Formula 1 or its derivative includes aminoalcohol represented by Chemical Formula 3 and means a biomaterial selected from the group consisting of amino acid, nucleotide, amino acid ester, amino acid amide, and combinations thereof.

Hereinafter, the present disclosure will be explained in more detail with reference to Examples. However, the following Examples are illustrative only for better understanding of the present disclosure but do not limit the present disclosure.

Examples

Example 1: Synthesis of Compounds 1 to 3

1) compound 1 [2-(((2-benzoylphenyl)amino)phenyl)boronic acid]

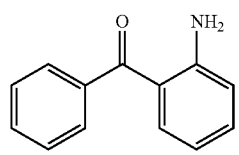

+

-continued

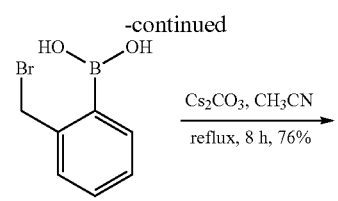

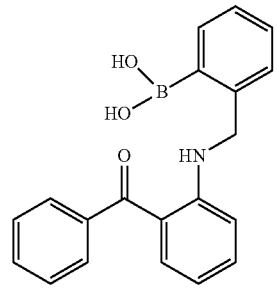

2-aminobenzophenone (193 mg, 0.98 mmol) and cesium carbonate (318 mg, 0.98 mmol) were added to 2-bromomethylphenyl boronic acid (210 mg, 0.98 mmol) in acetonitrile solvent (1.5 mL) while refluxing under $N_2$ for 8 hours at 85° C. The progress of the reaction was monitored by TLC test and compound 1 (250 mg, yield=77%) was isolated by silica gel column chromatography with EA/Hex (1:4) without work-up process.

$^1$H NMR: 7.64-7.61 (m, 1H), 7.60-7.59 (m, 1H), 7.58-7.55 (m, 2H), 7.53-7.52 (m, 1H), 7.51-7.47 (m, 1H), 7.43-7.39 (m, 2H), 7.38-7.33 (m, 2H), 7.30-7.25 (m, 1H), 6.88 (d, 1H, 9 Hz), 6.59-6.54 (m, 1H), 4.65 (s, 2H). $^{13}$C NMR: 199.58, 151.38, 143.75, 140.62, 135.42, 135.20, 134.56, 131.24, 129.91, 129.11, 128.39, 128.01, 126.77, 114.63, 112.68, 46.99. HRMS (EI): $C_{20}H_{18}BNO_3$ [M+H]$^+$: calcd 331.1384; found 332.1595.

2) Compound 2

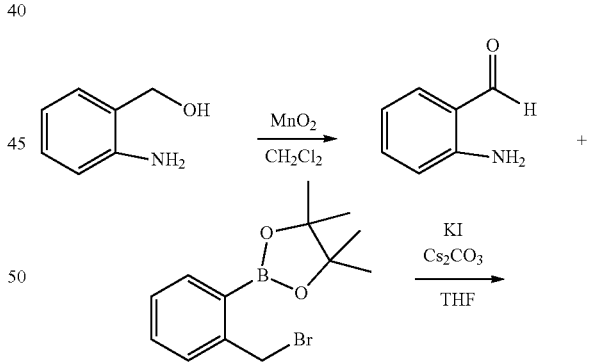

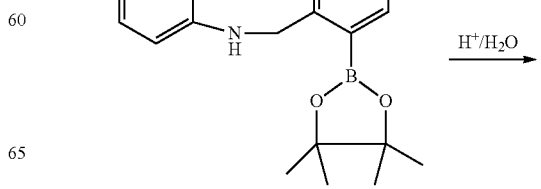

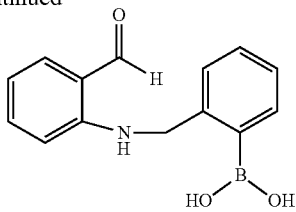

2-aminobenzyl alcohol (2.0 g, 16 mmol) was dissolved in methylene chloride (50 mL), 10 eq of $MnO_2$ was added thereto, followed by stirring and refluxing for 6 hr at 60° C. After filtering $MnO_2$ and evaporating the solvent, 2-aminobenzaldehyde was separated by column chromatography using developing solution (ethyl acetate: n-hexane=1:4 mixed solution) (yield: 90%). After reacting in THF solvent in the presence of 2-bromomethylphenylboronic acid and $Cs_2CO_3$ (1.2 eq)/KI (0.2 eq) protected with 2-aminobenzaldehyde and pinacol, the pinacol was removed to obtain compound 2 (yield: 20%).

$^1$H NMR (300 MHz, $CDCl_3$): δ 9.79 (s, 1H), 9.0 (br, 1H), 7.83 (d, 1H), 7.51 (t, 1H), 7.25-7.48 (m, 4H), 6.87 (t, 1H), 6.79 (d, 1H), 4.64 (d, 2H).

3) Compound 3

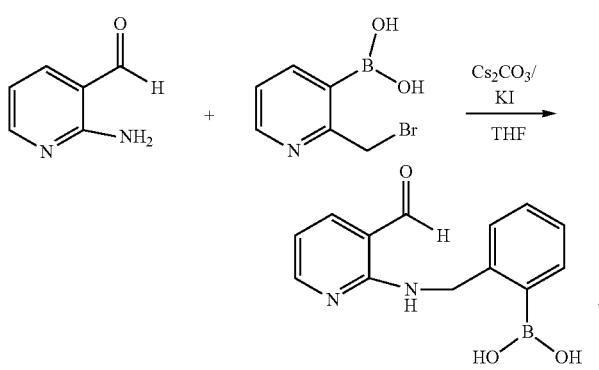

2-aminonicotinaldehyde (1.0 g, 8.2 mmol) and 2-bromomethylphenylboronic acid (1.8 g, 8.4 mmol) in 30 mL of THF were stirred in the presence of 0.1 eq of KI and 1.2 eq of $Cs_2CO_3$ at room temperature for 24 hr. compound 3 was obtained by column chromatography method using developing solution in which ethyl acetate and n-hexane were mixed in a 1:9 ratio (yield:10).

$^1$H NMR (300 MHz, $CDCl_3$): δ 9.85 (s, 1H), 9.39 (br, 1H), 8.16 (d, 1H), 7.70 (d, 1H), 7.44 (d, 1H), 7.2-7.5 (m, 3H), 6.48 (m, 1H), 4.73 (d, 2H).

Example 2: Synthesis of Compound 4 [(2-(benzylamino)phenyl)(phenyl)methanone]

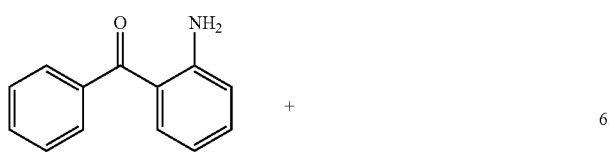

2-aminobenzophenone (0.10 mg, 0.51 mmol), benzyl bromide (0.072 mL, 1.37 mmol) and potassium carbonate (0.19 g, 1.37 mmol) were added to acetonitrile (1.5 mL) and refluxed for 8 hours. The progress of the reaction was monitored by TLC test and compound 4 (132 mg, yield=91%) was obtained by silica gel column chromatography using developing solution ethyl acetate/n-hexane (1:49) without work-up process.

$^1$H NMR: 9.11 (t, 1H, 3 Hz), 7.72-7.71 (m, 1H), 7.70-7.68 (m, 1H), 7.61-7.55 (m, 2H), 7.54-7.53 (m, 1H), 7.51-7.50 (m, 1H), 7.48-7.47 (m, 1H), 7.46-7.43 (m, 2H), 7.42-7.41 (m, 1H), 7.39-7.38 (m, 1H), 7.36-7.31 (m, 1H), 6.82 (d, 1H, 9 Hz), 6.65-6.59 (m, 1H), 4.58 (d, 2H, 6 Hz). $^1$C NMR: 199.49, 151.70, 140.55, 138.66, 135.58, 135.07, 129.16, 128.81, 128.14, 127.21, 117.61, 114.26, 112.13, 47.04. HRMS (EI): $C_{20}H_{17}NO$ [M+H]$^+$: calcd. 287.1314; found 289.1951.

Example 3: Synthesis of Compound 5 [1-(2-(((2-benzoylphenyl)amino)methyl)phenyl)-3-phenylurea]

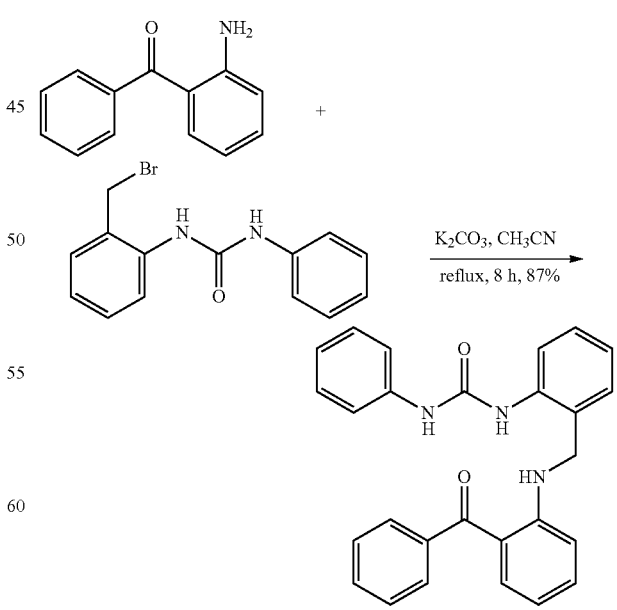

Uryl with bromobenzene (925 mg, 3.04 mmol) and potassium carbonate (418 mg, 3.08 mmol) in acetonitrile solvent (1.5 mL) were added to 2-aminobenzophenone (500 mg, 2.53 mmol) and refluxed for 8 hours under N$_2$. The progress of the reaction was monitored by TLC test and compound 5 (929 mg, yield=87%) was obtained by silica gel column chromatography using developing solution EA/Hex (1:9) without work-up process.

$^1$H NMR: 8.91 (bs, 1H), 7.62-7.59 (m, 2H), 7.53-7.41 (m, 5H), 7.37-7.30 (m, 3H), 7.26-7.15 (m, 6H), 7.06-7.00 (m, 2H), 6.70 (d, 1H, 9 Hz), 6.57 (t, 1H, 9 Hz), 4.34 (s, 2H). $^{13}$C NMR: 199.85, 153.69, 151.51, 140.31, 139.60, 138.66, 138.14, 135.59, 135.29, 131.01, 129.52, 129.10, 129.08, 128.15, 123.70, 122.33, 120.53, 119.36, 118.91, 117.47, 114.43, 112.15, 46.87. HRMS (EI): C$_{27}$H$_{23}$N$_3$O$_2$ [M+H]$^+$: calcd 421.1963; found 422.1951.

Example 4: Synthesis of Compound 6 [(2-((naphthalen-1-ylamino)methyl)phenyl)boronic acid]

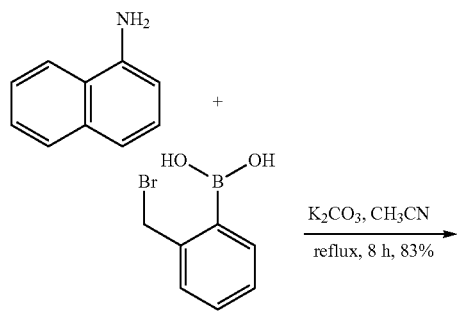

2-(bromomethyl)phenyl boronic acid (0.150 g, 0.70 mmol) and potassium carbonate (0.19 g, 1.37 mmol) in acetonitrile solvent (1.5 mL) were added to 1-naphthylamine (0.10 mg, 0.07 mmol) and refluxed for 8 hours at room temperature. Compound 6 (160 mg, yield=83%) was obtained by silica gel column chromatography using developing solution EA/Hex (1:9).

$^1$HNMR: 7.98-7.95 (m, 1H), 7.84-7.81 (m, 1H), 7.75-7.72 (m, 1H), 7.52-7.44 (m, 2H), 7.43-7.42 (m, 1H), 7.41-7.36 (m, 1H), 7.35-7.30 (m, 3H), 6.81-6.79 (m, 1H), 4.64 (s, 2H). $^{13}$C NMR: 143.31, 143.05, 134.96, 134.52, 130.03, 129.28, 128.58, 127.09, 126.71, 126.61, 126.23, 125.31, 124.67, 121.11, 119.12, 107.18, 49.63. HRMS (EI): calcd for C$_{17}$H$_{16}$BNO$_2$ [M+H]$^+$: calcd 277.1275; found 278.1315.

Example 5: Confirmation of the Reaction Products of Compound 1 and Various Aminoalcohols In the Examples of the present disclosure, the following aminoalcohols were used, the reaction products of compound 1 and the following aminoalcohols were confirmed:

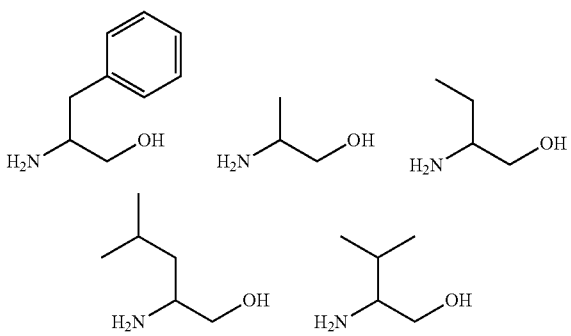

1) General procedure of reaction of compound 1 and the above aminoalcohols

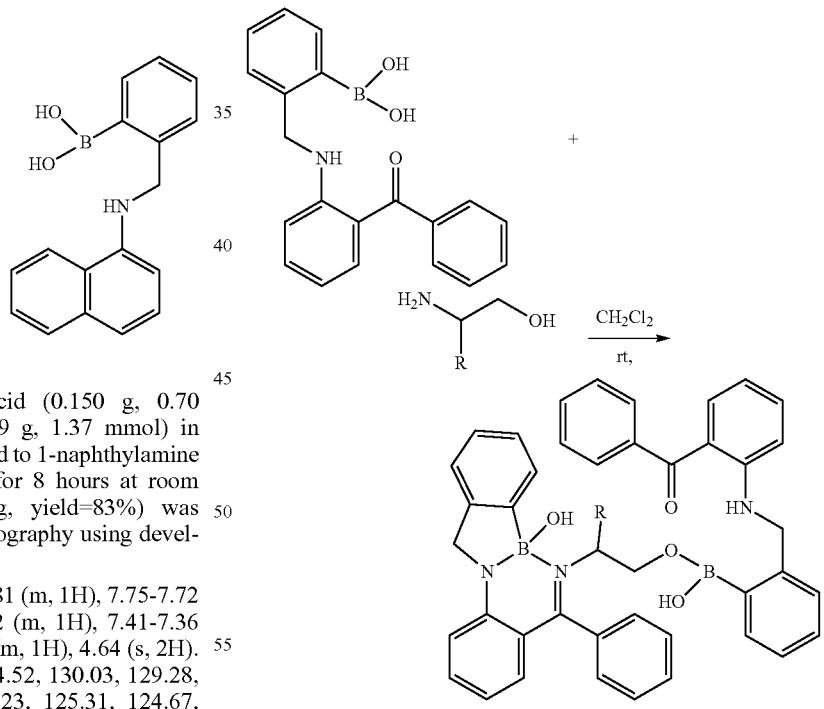

0.5 eq of (R)-(−)-2-amino-1-propanol (2.27 mg, 0.03 mmol) in CH$_2$Cl$_2$ (0.6 mL) was added to compound 1 (20 mg, 0.06 mmol) and mixed for 4 hours at room temperature. The imine formation of the product was monitored by 1H NMR spectroscopy. Further, specific structures were predicted through $^{13}$C NMR and COSY spectroscopy. In addition, the same procedure was also conducted for (S)-(+)-2-amino-1-propanol.

2) Amino phenyl propanol

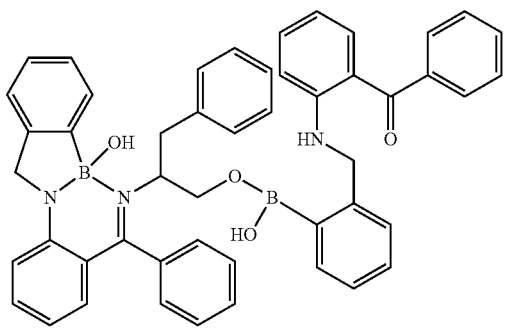

0.5 eq of amino phenyl propanol (4.53 mg, 0.03 mmol) in CH$_2$Cl$_2$ (0.6 mL) was added to compound 1 (20 mg, 0.06 mmol) and mixed for 4 hours at room temperature. The imine formation of the product was monitored by $^1$H NMR and $^{13}$C NMR spectroscopy:

$^1$H NMR: 8.99 (t, 1H, 3 Hz), 8.14 (d, 1H, 3 Hz), 7.80 (d, 1H, 9 Hz), 7.66-7.64 (m, 2H), 7.58-7.46 (m, 8H), 7.42-7.30 (m, 7H), 7.22-7.17 (m, 6H), 7.00 (d, 1H, 3 Hz), 6.76 (d, 2H, 6 Hz), 6.57-6.48 (m, 3H), 6.37 (t, 1H, 9 Hz), 6.10 (d, 1H, 9 Hz), 5.57 (t, 1H, 12 Hz), 5.08 (d, 1H, 15 Hz), 4.77-4.68 (m, 3 Hz), 4.43 (dd, 1H, 6 Hz, 9 Hz), 4.27 (dd, 1H, 3 Hz, 9 Hz), 4.03 (dd, 1H, 6 Hz, 6 Hz), 3.36 (dd, 1H, 9 Hz, 6 Hz). $^{13}$C NMR: 199.10, 171.26, 152.39, 150.09, 145.54, 145.18, 141.08, 137.31, 136.78, 136.28, 135.46, 134.93, 134.24, 134.22, 131.90, 130.69, 130.20, 129.43, 129.28, 129.12, 128.81, 128.64, 128.29, 128.16, 128.01, 127.22, 126.85, 126.61, 126.46, 128.04, 123.41, 117.24, 115.39, 115.15, 114.72, 113.42, 112.77, 66.72, 69.85, 53.54, 46.28, 35.57, 29.95.

3) Alaninol

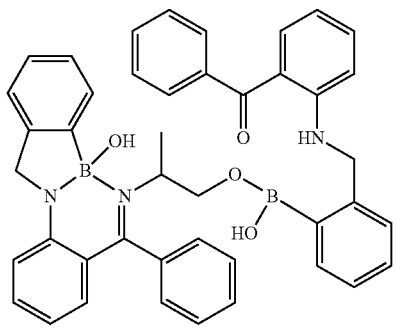

0.5 eq of alaninol (2.25 mg, 0.03 mmol) in CH$_2$Cl$_2$ (0.6 mL) was added to compound 1 (20 mg, 0.06 mmol) and mixed for 4 hours at room temperature. The imine formation of the product was monitored by $^1$H NMR and $^{13}$C NMR spectroscopy:

$^1$H NMR: 8.93 (t, 1H, 6 Hz), 7.93 (t, 1H, 6 Hz), 7.77-7.42 (m, 1H), 7.65-7.61 (m, 1H), 7.61-7.59 (m, 1H), 7.58-7.39 (m, 9H), 7.37-7.24 (m, 6H), 7.19-7.09 (m, 3H), 6.90 (d, 1H, 9 Hz), 6.59 (dd, 1H, 3 Hz, 6 Hz), 6.54 (d, 1H, 9 Hz), 6.49-6.44 (m, 1H), 6.38-6.32 (m, 1H), 5.48 (t, 1H, 12 Hz), 4.98 (d, 1H, 15 Hz), 4.70 (dd, 1H, 6 Hz, 6 Hz), 4.63 (d, 1H, 15 Hz), 4.50-4.39 (m, 1H), 4.14 (dd, 1H, 6 Hz, 6 Hz), 1.31 (s, 3H). $^{13}$C NMR: 199.15, 170.67, 152.41, 150.04, 145.27, 145.14, 141.10, 136.82, 136.22, 135.50, 134.98, 134.66, 134.09, 131.40, 130.71, 130.19, 129.50, 129.28, 129.08, 128.24, 128.19, 127.22, 127.03, 120.50, 128.43, 128.07, 123.29, 117.28, 115.08, 114.65, 113.54, 112.78, 66.06, 61.16, 53.48, 46.33, 29.97, 15.27.

4) 2-amino-1-butanol

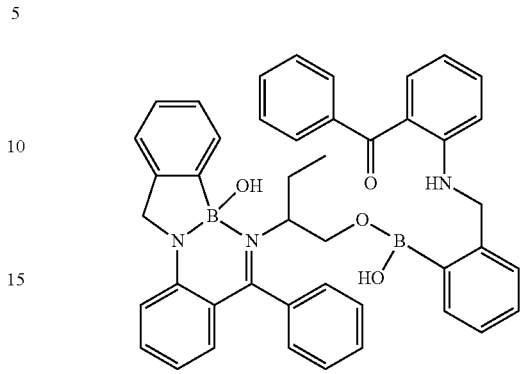

0.5 eq of 2-amino-1-butanol (2.67 mg, 0.03 mmol) in CH$_2$Cl$_2$ (0.6 mL) was added to compound 1 (20 mg, 0.06 mmol) and mixed for 4 hours at room temperature. The imine formation of the product was monitored by 1H NMR and 13C NMR spectroscopy:

$^1$H NMR: 8.90 (t, 1H, 6 Hz), 7.91-7.89 (m, 1H), 7.75 (d, 1H, 6 Hz), 7.61-7.58 (m, 2H), 7.56-7.47 (m, 5H), 7.46 (m, 2H), 7.44 (d, 1H, 3 Hz), 7.40-7.34 (m, 4H), 7.32-7.25 (m, 3H), 7.17-7.09 (m, 3H), 6.91 (d, 1H, 6 Hz), 6.55-6.43 (m, 3H), 6.38-6.33 (m, 1H), 5.40 (t, 1H, 12 Hz), 4.96 (d, 1H, 15 Hz), 4.72-4.54 (m, 2H), 4.42-4.24 (m, 3H), 1.95-1.78 (m, 2H), 0.71 (t, 3H, 9 Hz). $^{13}$C NMR: 199.11, 170.87, 152.40, 149.99, 145.40, 145.17, 141.08, 136.72, 136.24, 135.45, 134.94, 134.78, 134.21, 131.56, 130.68, 130.17, 129.43, 129.24, 129.16, 128.70, 128.41, 128.16, 128.04, 128.39, 128.02, 123.23, 117.22, 115.38, 115.07, 114.57, 113.40, 112.79, 66.71, 64.78, 53.34, 46.23, 29.95, 23.03, 11.39.

5) Leucenol

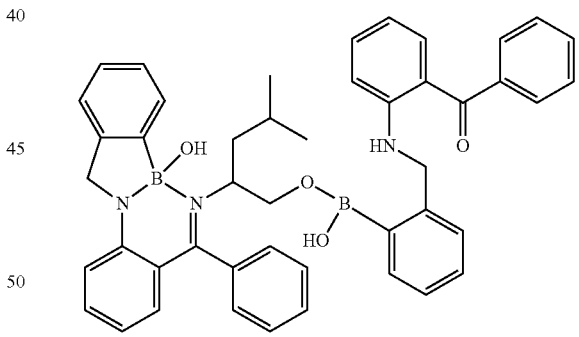

0.5 eq of leucinol (3.51 mg, 0.03 mmol) in CH$_2$Cl$_2$ (0.6 mL) was added to compound 1 (20 mg, 0.06 mmol) and mixed for 4 hours at room temperature. The imine formation of the product was monitored by 1H NMR and 13C NMR spectroscopy:

$^1$H NMR: 8.92 (t, 1H, 6 Hz), 7.87 (t, 1H, 6 Hz), 7.75-7.72 (m, 1H), 7.61-7.57 (m, 2H), 7.55-7.48 (m, 5H), 7.46 (d, 2H, 3 Hz), 7.43 (d, 1H, 3 Hz), 7.40-7.36 (m, 3H), 7.34 (t, 1H, 3 Hz), 7.31-7.22 (m, 2H), 7.18-7.08 (m, 3H), 6.90 (d, 1H, 9 Hz), 6.56 (dd, 1H, 3 Hz, 6 Hz), 6.50 (d, 1H, 6 Hz), 6.45-6.42 (m, 1H), 6.37-6.32 (m, 1H), 5.40 (t, 1H, 12 Hz), 4.96 (d, 1H, 15 Hz), 4.71-4.53 (m, 3H), 4.37-4.22 (m, 2H), 1.90 (t, 1H, 6 Hz), 1.55-1.48 (m, 2H), 0.68 (d, 3H, 6 Hz), 0.54 (d, 3H, 6 Hz). $^{13}$CNMR: 199.10, 170.59, 152.41, 149.99, 145.272, 145.195, 141.093, 136.74, 136.22, 135.45, 134.94, 134.63, 134.15, 131.50, 130.70, 130.19, 129.47, 129.27, 129.17, 128.67, 128.20, 128.16, 127.01, 126.41, 126.37, 126.02, 123.24, 117.25, 115.32, 115.05, 114.55, 113.41, 112.81, 95.01, 64.66, 63.46, 53.33, 46.24, 39.08, 29.95, 25.03, 23.23, 21.79.

6) Valinol

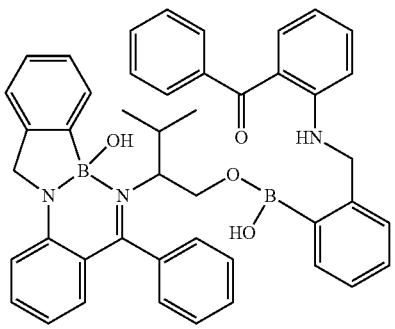

0.5 eq of valinol (3.09 mg, 0.03 mmol) in CH$_2$Cl$_2$ (0.6 mL) was added to compound 1 (20 mg, 0.06 mmol) and mixed for 4 hours at room temperature. The imine formation of the product was monitored by 1H NMR and 13C NMR spectroscopy:

$^1$H NMR: 8.89 (t, 1H, 6 Hz), 7.91 (t, 1H, 6 Hz), 7.76 (d, 1H, 9 Hz), 7.59 (t, 3H, 6 Hz), 7.51-7.20 (m, 11H), 7.18-7.09 (m, 4H), 6.96 (d, 1H, 9 Hz), 6.90-6.81 (m, 1H), 6.56-6.43 (m, 2H), 6.38 (t, 1H, 9 Hz), 5.37 (t, 1H, 9 Hz), 4.97 (d, 1H, 15 Hz), 4.72 (d, 1H, 15 Hz), 4.64 (d, 1H, 6 Hz), 4.46 (dd, 1H, 6 Hz), 4.30 (dd, 1H, 6 Hz), 4.19 (dd, 1H, 6 Hz), 4.09-3.95 (m, 1H), 0.88 (d, 3H, 6 Hz), 0.62 (d, 3H, 6 Hz). $^{13}$C NMR: 199.12, 170.84, 152.44, 149.99, 145.52, 145.26, 141.11, 136.66, 136.33, 135.46, 134.94, 134.37, 131.69, 130.72, 130.21, 129.65, 129.45, 129.29, 129.20, 129.08, 128.41, 128.25, 128.19, 127.15, 126.46, 126.38, 126.04, 123.23, 120.64, 117.25, 115.84, 115.18, 114.57, 113.45, 112.88, 112.31, 70.83, 64.52, 53.28, 46.18, 28.18, 21.58, 19.37.

7) Trytophanol

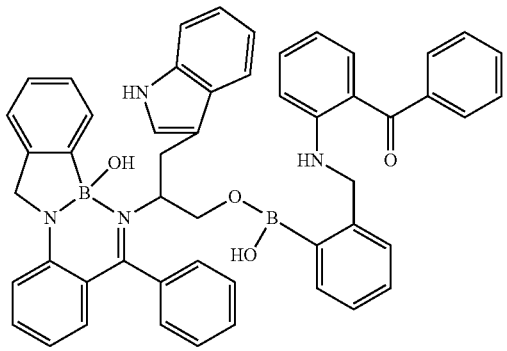

0.5 eq of trytophanol (5.70 mg, 0.03 mmol) in CH2Cl2 (0.6 mL) was added to compound 1 (20 mg, 0.06 mmol) and mixed for 4 hours at room temperature. The imine formation of the product was monitored by $^1$H NMR and $^{13}$C NMR spectroscopy:

$^1$H NMR: 8.99 (t, 1H, 6 Hz), 8.20 (d, 1H, 3 Hz), 8.17 (s, 1H), 7.77 (d, 1H, 6 Hz), 7.65-7.62 (m, 2H), 7.56 (d, 1H, 61H z), 7.53-7.45 (m, 5H), 7.42-7.26 (m, 71H), 7.19-7.08 (m, 41H), 7.02 (t, 1H, 61H z), 6.96 (d, 1H, 6 Hz), 6.88 (t, 1H, 6 Hz), 6.76 (d, 1H, 9 Hz), 6.56-6.46 (m, 4H), 6.36 (t, 1H, 9 Hz), 6.18 (d, 1H, 6 Hz), 5.58 (t, 1H, 12 Hz), 5.05 (d, 1H, 15 Hz), 4.94-4.84 (m, 1H), 4.75-4.68 (m, 2H), 4.42 (dd, 1H, 6 Hz), 4.21 (dd, 1H, 6 Hz), 3.30 (d, 2H, 6 Hz). 13C NMR: 152.47, 150.08, 145.66, 145.23, 141.14, 138.19, 136.80, 136.41, 136.33, 135.56, 135.08, 134.30, 131.99, 130.79, 130.27, 129.37, 129.33, 129.06, 128.83, 128.56, 128.26, 128.00, 127.47, 127.31, 126.70, 126.56, 126.18, 125.64, 123.52, 122.74, 122.25, 119.52, 118.61, 117.30, 115.58, 115.19, 114.72, 113.57, 112.86, 111.39, 111.08, 65.44, 65.06, 53.64, 46.42, 25.77, 21.79

8) Ethanol amine

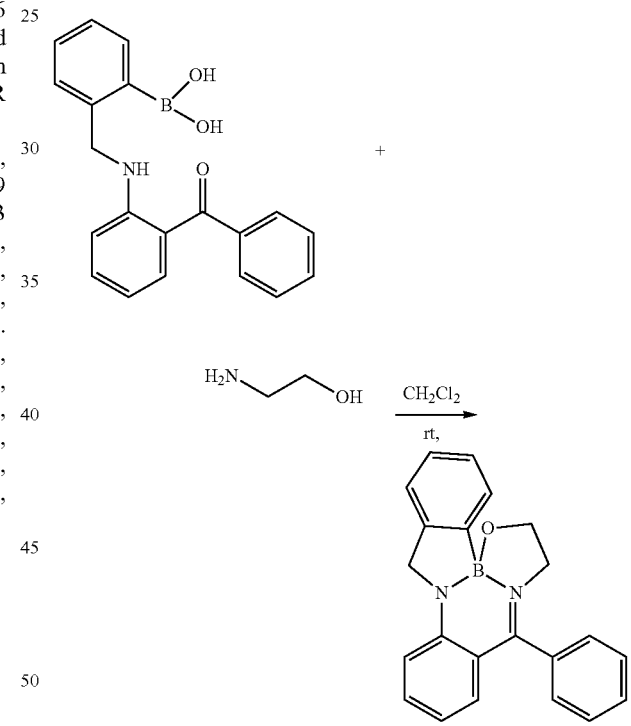

1 eq of ethanol amine (3.66 mg, 0.06 mmol) in CH$_2$Cl$_2$ (0.6 mL) was added to compound 1 (20 mg, 0.06 mmol) and mixed for 4 hours at room temperature. The imine formation of the product was monitored by $^1$H NMR and $^{13}$C NMR spectroscopy:

$^1$H NMR: 7.91 (t, 1H 3 Hz), 7.66 (d, 1H, 6 Hz), 7.55-7.60 (m, 1H), 7.41-7.53 (m, 1H), 7.26-7.45 (m, 5H), 6.98 (d, 1H, 9 Hz), 6.87 (d, 1H, 6 Hz), 6.70-6.73 (m, 1H), 6.43-6.49 (m, 1H), 4.97 (d, 1H, 15 Hz), 4.55 (d, 1H, 15 Hz), 3.80-3.98 (m 1H). $^{13}$C NMR: 169.45, 149.48, 145.27, 135.73, 134.15, 133.72, 131.13, 129.57, 128.84, 128.57, 128.16, 128.12, 127.03, 126.44, 122.34, 117.02, 114.90, 114.82, 62.77, 54.93, 54.26.

9) amino propanol

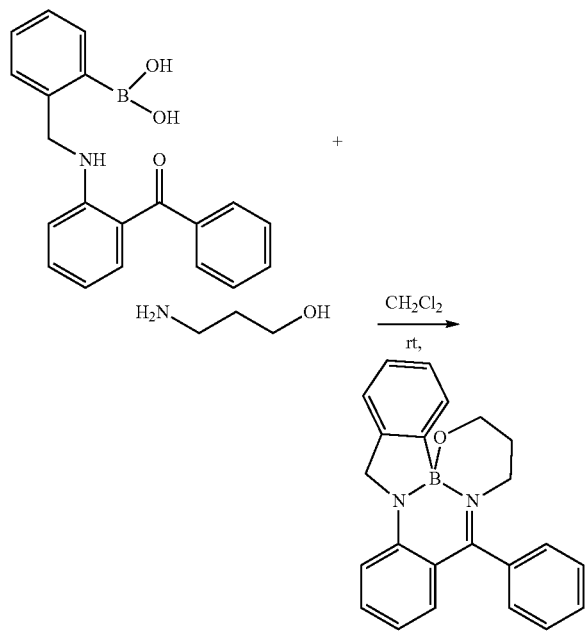

1 eq of amino propanol (4.55 mg, 0.06 mmol) in $CH_2Cl_2$ (0.6 mL) was added to compound 1 (20 mg, 0.06 mmol) and mixed for 4 hours at room temperature. The imine formation of the product was monitored by $^1H$ NMR and $^{13}C$ NMR spectroscopy:

$^1H$ NMR: 7.93 (d, 1H, 10 Hz) 7.60 (d, 1H, 5 Hz), 7.48-7.56 (m, 3H), 7.38 (d, 1H 10 Hz), 7.23-7.32 (m, 4H), 7.08 (d, 1H, 10 Hz) 6.80 (d, 1H, 10 Hz), 6.61 (d, 1H, 10 Hz), 4.53 (d, 1H, 15 Hz), 4.39 (d, 1H, 15 Hz), 4.35 (t, 1H, 15 Hz), 4.25 (t, 1H, 15 Hz), 3.91-3.95 (m, 1H) 3.70-3.73 (m, 1H), 2.25-2.35 (m, 1H), 1.90 (d, 1H, 15 Hz). $^{13}C$ NMR: 168.00, 151.45, 144.62, 136.22, 133.58, 133.16, 129.94, 129.70, 129.21, 129.02, 127.02, 127.37, 127.18, 126.59, 125.49, 123.11, 115.47, 115.37, 114.48, 61.24, 55.21, 50.61, 29.82.

Example 6: Confirmation of Reactivity of Compounds 1 to 6, and Aminoalcohol

Figure 1B:
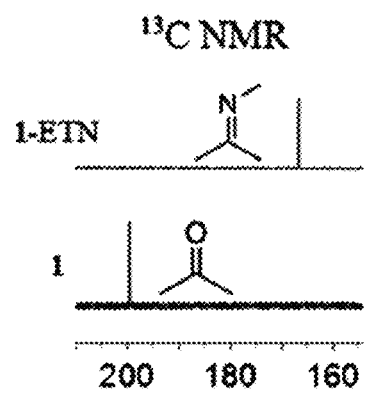
Figure 1C:
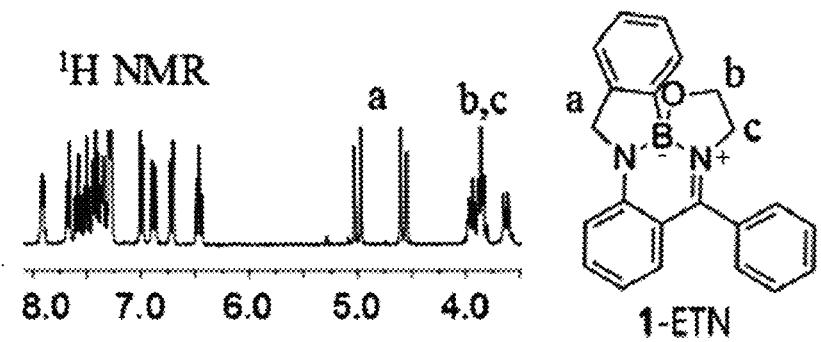
FIG. 1C shows $^1$H NMR and expected structure in case of the addition of ethanolamine to compound 1 by 1:1.
Figure 1D:
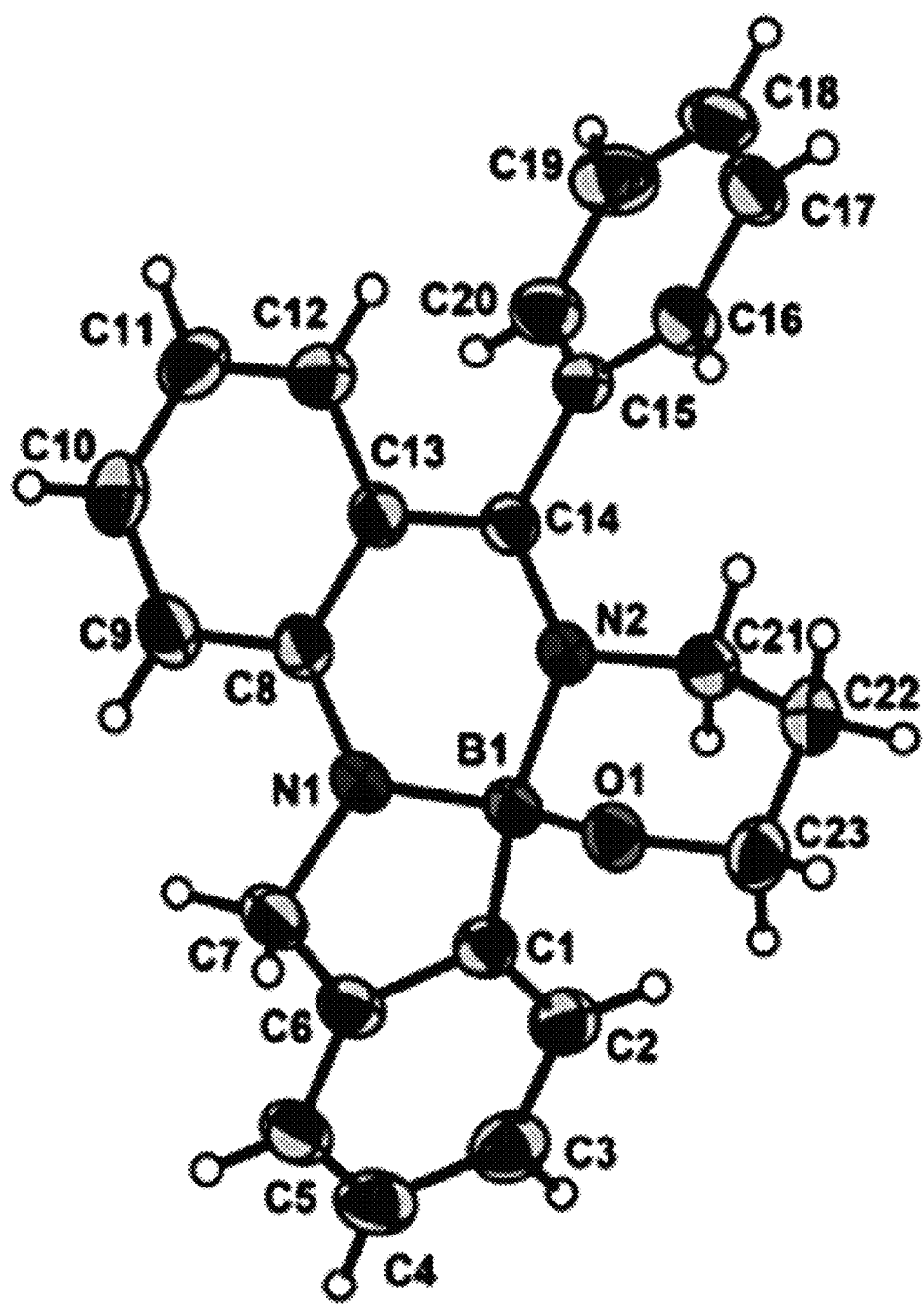
FIG. 1D shows ORTEP diagram of 1-aminopropanol, in accordance with an example of the present disclosure.
Figure 2A:
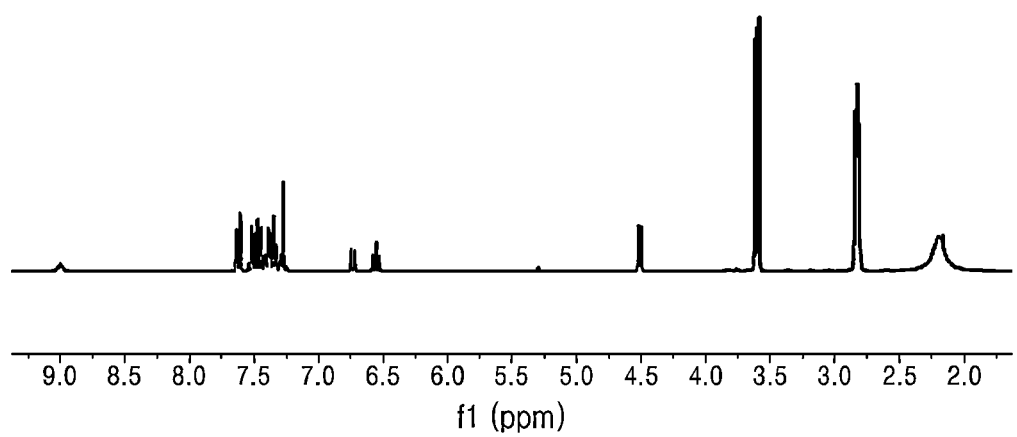
FIG. 2A shows $^1$H NMR of 1:5 adduct formation by reaction of compound 4 and ethanolamine.
Figure 2B:
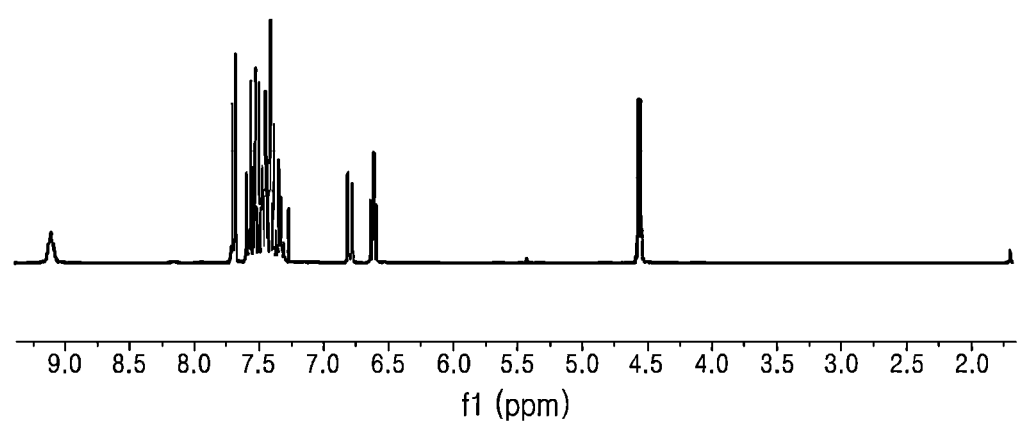
FIG. 2B shows $^1$H NMR of compound 4.
Figure 2C:
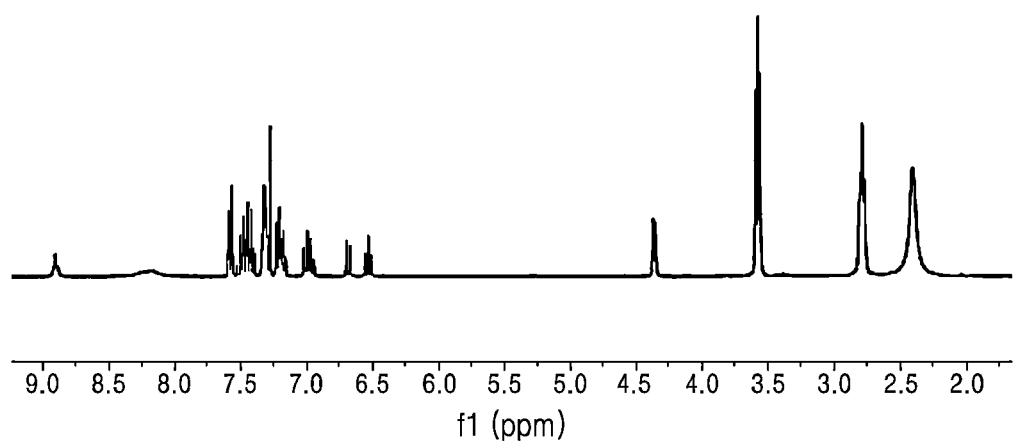
FIG. 2C shows $^1$H NMR of 1:5 adduct formation by reaction of compound 5 and ethanolamine.
Figure 2D:
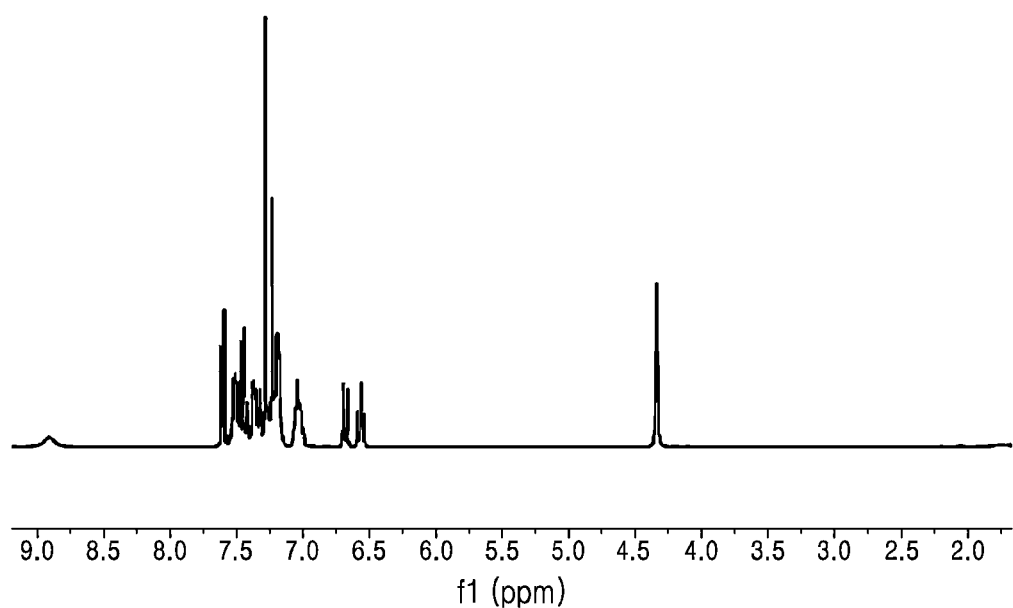
FIG. 2D shows $^1$H NMR of compound 5, in accordance with an example of the present disclosure.

Compounds 1 to 6 synthesized in Examples 1 to 4 were reacted with ethanol amine as aminoalcohol and product was analyzed by NMR spectroscopy. As a result, in the cases of compounds 4 to 6, no significant change was observed in $^1H$ NMR. However, in the case of compound 1, it was confirmed that a yellow precipitate was generated within 5 minutes after mixing with ETN and $^{11}B$ NMR and $^{13}C$ NMR signals were significantly changed by adding ETN under $CD_2Cl_2$ (FIGS. 1A and 1B). Specifically, the generation of the characteristic $^{13}C$ NMR signal at 165 ppm strongly suggests the ketimine formation between the amine and carbonyl groups. In addition, the $^{11}B$ NMR signal at 28 ppm for compound 1 dramatically shifts to ~3 ppm, implying a significant environmental change around the boron atom.

However, no significant change in the $^1H$ and 13C NMR spectra was observed when compound 1 was exposed to simple primary amines such as ethylamine and aniline, which indicates that the hydroxyl group of the aminoalcohol plays an important role in enabling the ketimine formation. Specifically, compounds 4 and 5, which are similar to compound 1 but do not have a boronic acid functional group, do not react with aminoalcohol to form imine under room temperature conditions, even though containing a carbonyl group (C=O), and thus, fluorescence or CD signals cannot be produced. The uryl group of compound 5 has a property as a Lewis acid such as boronic acid, but it could not react with aminoalcohol, and thus, it was confirmed that the boronic acid group plays a special role in formation of imine and N—B—N hetero ring (FIG. 2).

In addition, compound 6 has a fluorescence chromophore of a naphtylamine group, but the fluorescence is quenched by unshared electron pair present in N under general conditions, and significant fluorescence or CD changes were not observed even in the presence of aminoalcohol. Therefore, it is confirmed that generating fluorescence or CD of compound 1 in the presence of aminoalcohol is closely related to the formation of the N—B—N hetero ring. Summarizing the above results, it can be seen that only compounds 1 to 3 among compounds 1 to 6 react with aminoalcohol to show significant changes.

Example 7: Confirmation of Reaction Products According to the Equivalent of Compound 1 and Aminoalcohol The $^1H$ NMR spectra for the 1:1 mixture of compound 1 and alaninol (ANL) show complex patterns compared to that of compound 1 and ETN, whereas relatively well-resolved $^1H$ NMR spectrum with discrete signals appeared when 0.5 eq of ANL was added. Furthermore, the $^1H$ NMR spectrum becomes relatively simple when an excess amount of ANL is added. From inspection of the $^{11}B$, $^{13}C$ NMR, and $^1H$ NMR spectra recorded by varying the compound 1: ANL ratio in $CDCl_3$, it can be seen that at least three species are formed with 1:ANL ratios of 2:1, 1:1, and 1:2 (FIG. 3). Whereas the 2:1 product is dominant at 0.5 equiv, the 1:2 product is dominant at more than 5 eq of ANL.

Figure 4:
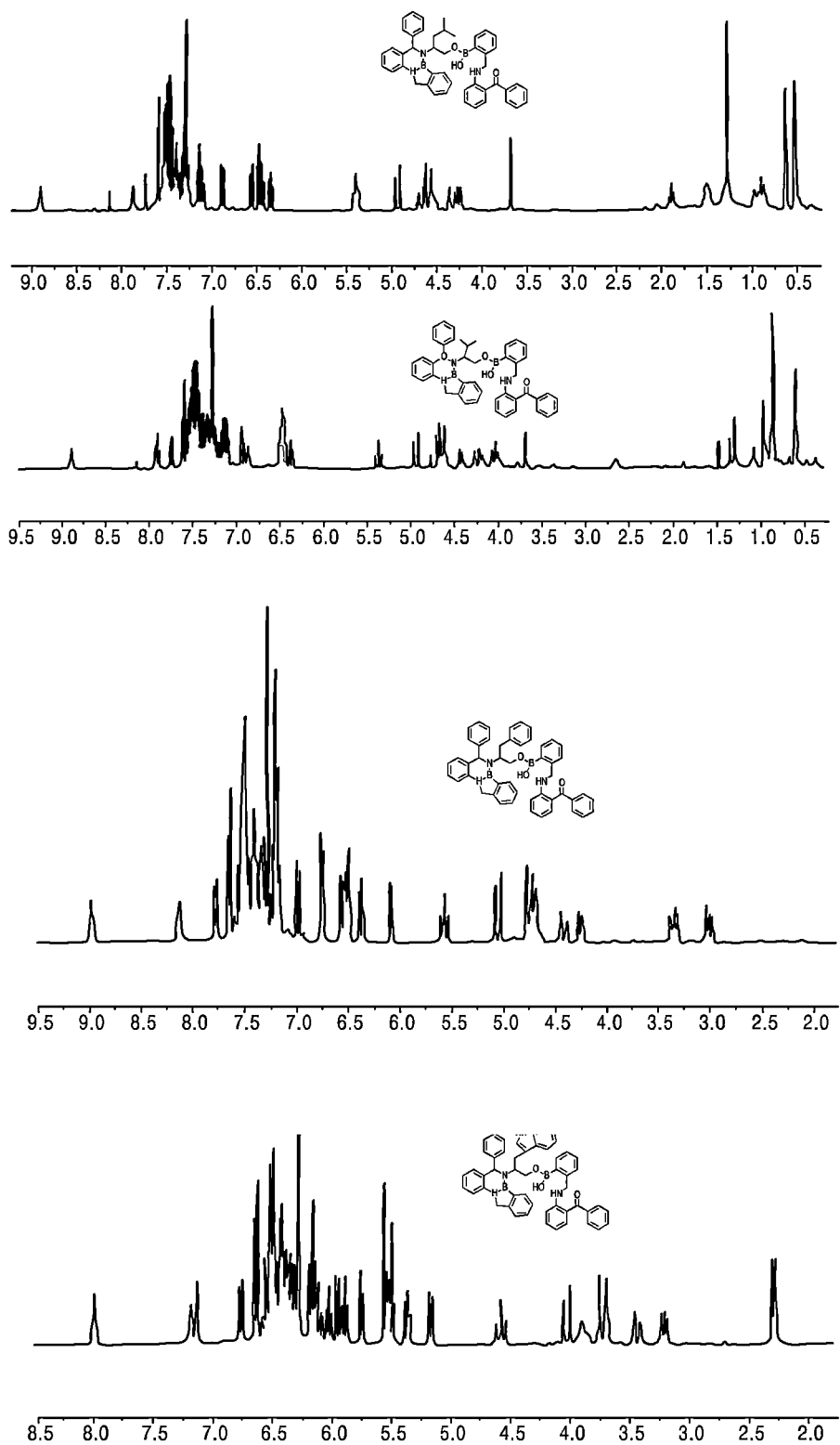
FIG. 4 shows $^1$H NMR of 2:1 adduct formation by reactions of compound 1 and various aminoalcohols in accordance with an example of the present disclosure.

Further, $^1H$ NMR spectra of 2:1 adduct formation for the reaction of compound 1 and other aminoalcohols also show similar results (FIG. 4), which are similar for alaninal as well as for aminobutanol, valinol, leucinol, phenylalaninol, and tryptophanol.

The results indicate that compound 1 shows a difference in reactivity according to the steric properties of the carbon bonded to the amine group, ethanol amine forms a 1:1 adduct very rapidly with compound 1 since there is no steric hindrance (FIGS. 5 to 7). On the other hand, alaninol forms 2:1 (compound 1: alaninol) adduct better instead of 1:1 adduct due to its steric hindrance, and it can be seen that 1:1 to 1:2 adducts are form when equivalents of alaninol is increased.

Based on the results, it can be seen that the fluorescence appears different depending on the amine compounds containing aminoalcohol, in particular, CD spectra can show significant difference to be distinguished from each other according to the type of the aminoalcohol. Therefore, it is confirmed that even the substrate can be distinguished, when compound 1 is used as probe.

In addition, referring to FIG. 8, it is confirmed by $^1H$ NMR spectrum that compound 2 produced 1:1 product with ethanol amine or alaninol, unlike compound 1, which shows that compounds represented by Chemical Formula 1 can be used for various purposes.

Example 8: Analysis Results for UV-Vis and Fluorescence Spectra of Products of Compound 1 and Aminoalcohol As a result of analyzing the changes in UV-vis and fluorescence spectra upon the addition of ANL and phenylalaninol (PANL) to compound 1 in $CH_2Cl_2$, an apparent off-on fluorescence signal was observed. A quantum yield of 39% was recorded when 64 eq of PANL were added to 0.5 mM solution of compound 1. A logarithmic relationship between the measured intensity and the equivalent of the aminoalcohols suggests the formation of 2:1 product at lower concentrations, and the formation of 1:2 products when an excess of the aminoalcohols is offered (FIG. 9). Based on the above results, the product of compound 1 and aminoalcohols reveals fluorescence signals and the intensity of the fluorescence signals have a logarithmic relationship with the equivalent of the aminoalcohols, which indicates that the concentration of aminoalcohols can be measured using compound 1 as probe.

Figure 10A:
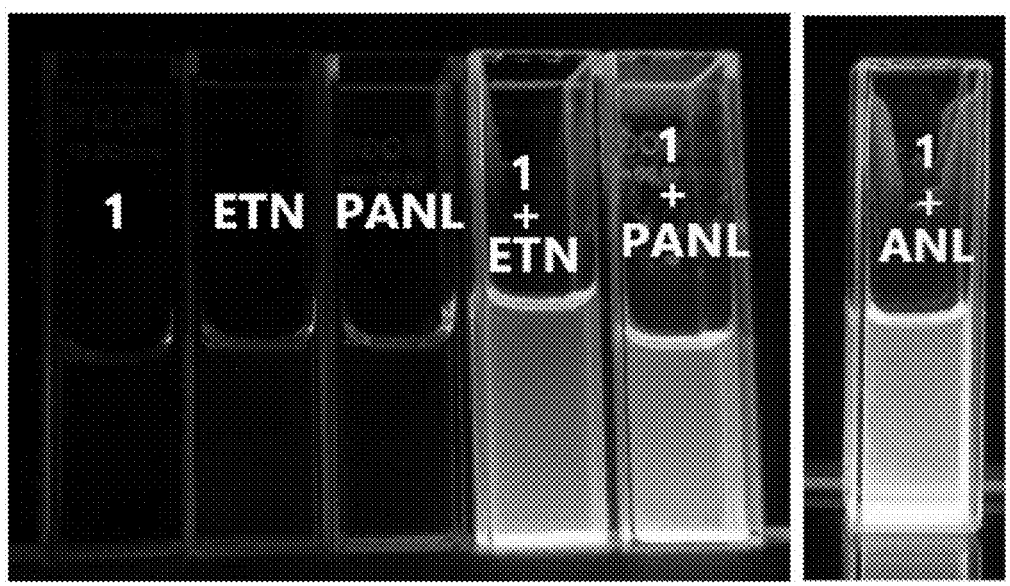
FIG. 10A shows fluorescence signal results of aminoalcohol according to the addition of compound 1 in accordance with an example of the present disclosure. Fluorescences were not observed for compound 1 alone (0.5 mM), ethanol amine alone (16 mM), and phenylalaninol alone (32 mM), while fluorescences were observed for compound 1 (0.5 mM)+ethanol amine (16 mM), compound 1+phenylalaninol (32 mM), and compound 1 (1.5 mM)+alaninol (93 mM).
Figure 10B:
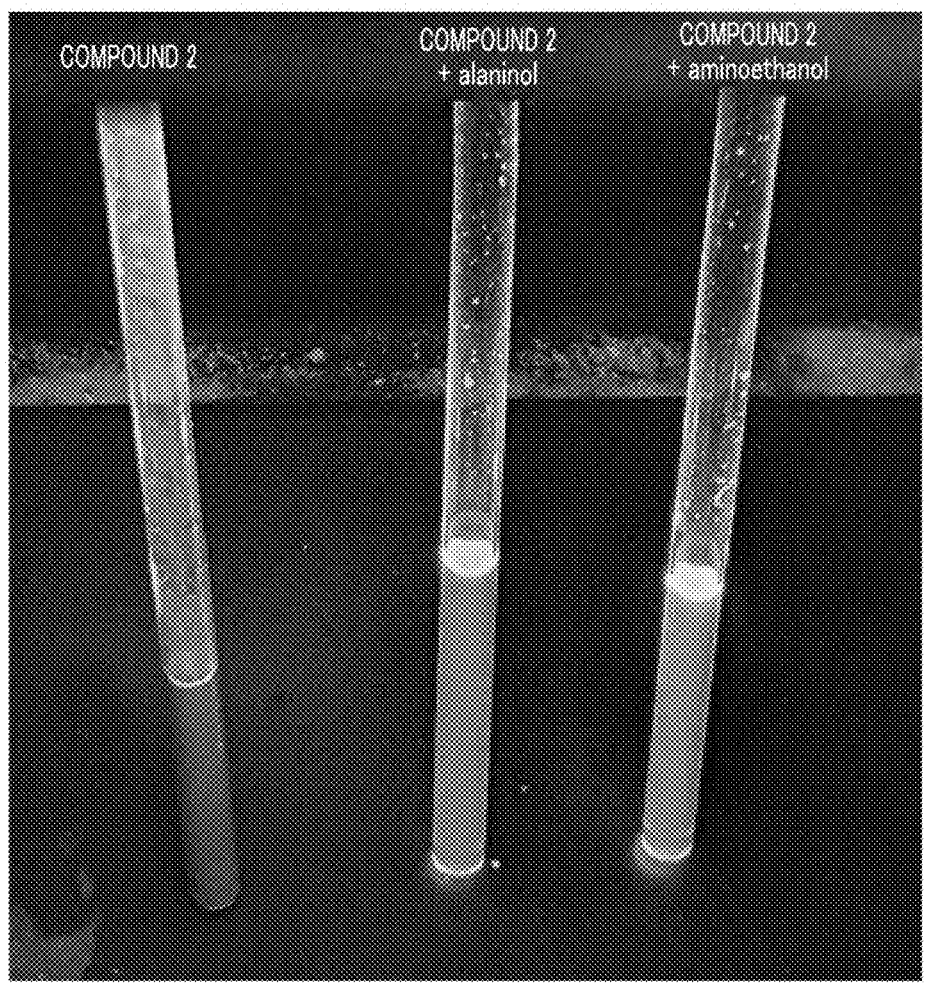
FIG. 10B shows fluorescence change when alaninol and ethanol amine were added.

In addition, it was confirmed that no fluorescense was observed in cases of compound 1 only (0.5 mM), ethanol amine only (16 mM), phenylalaninol only (32 mM) but fluorescence signals exhibited in cases of compound 1 (0.5 mM)+ethanol amine (16 mM), compound 1 (0.5 mM)+phenylalaninol (93 mM), and compound 1 (1.5 mM) and alaninol (93 mM) (FIG. 10A), and it was also confirmed that compound 2 exhibited strong fluorescence change when mixing with alaninol or ethanol amine (FIG. 10B).

Figure 11A:
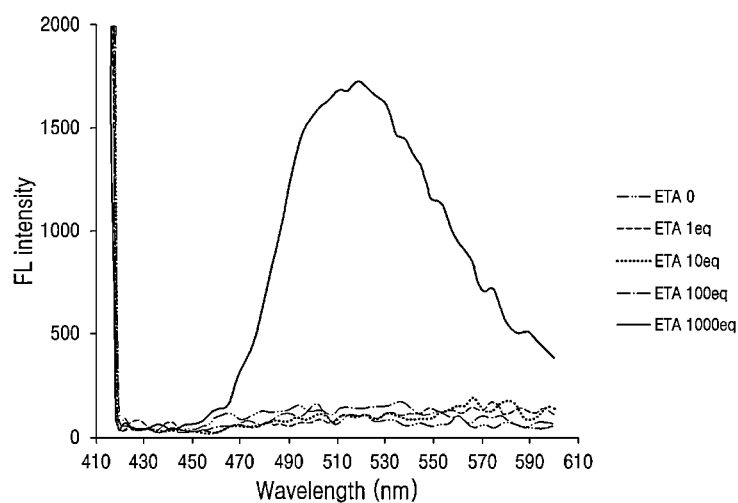
FIGS. 11A to 11H show fluorescence spectra changes of compound 1+ethanol amine (FIG. 11A), compound 1+alaninol (FIG. 11B), compound 1+phenylalaninol (FIG. 11C), compound 1+aminobutanol (FIG. 11D), compound 1+valinol (FIG. 11E), compound 1+leucinol (FIG. 11F), compound 1+tryptophanol (FIG. 11G), and comparative examples (compound 1+alaninol, leucinol, aminobutanol, phenylalaninol) (FIG. 11H), respectively, when compound 1 is used as a probe in accordance with an example of the present disclosure.
Figure 11B:
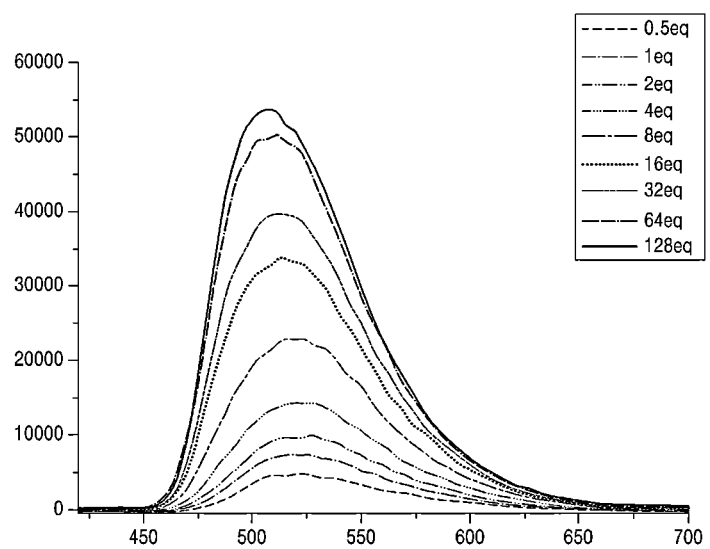
Figure 11C:
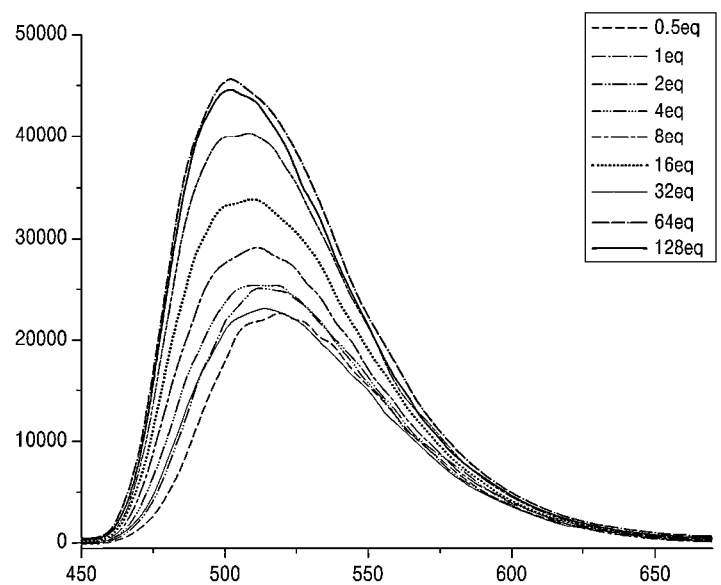
Figure 11D:
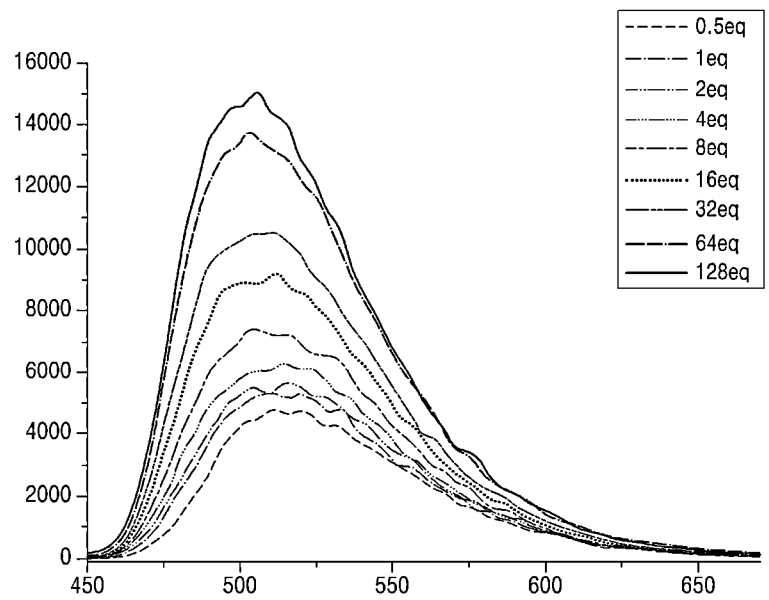
Figure 11E:
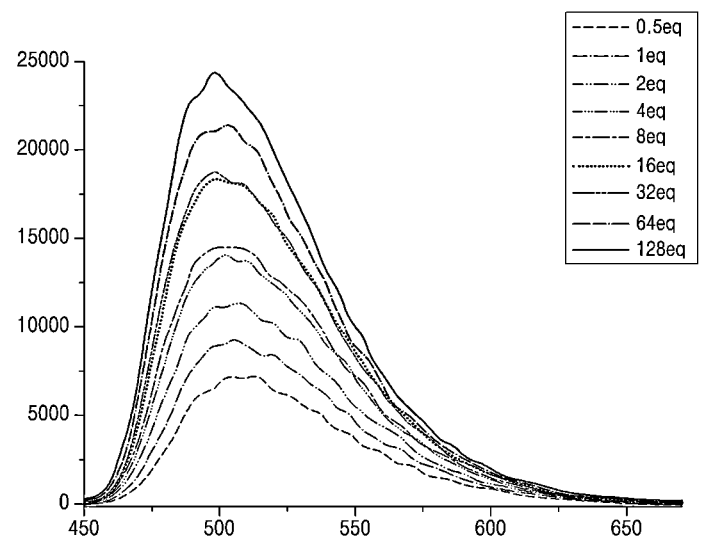
Figure 11F:
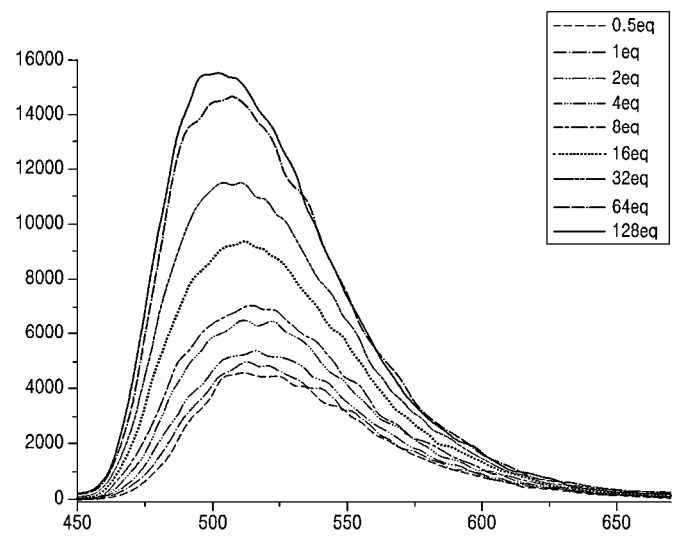
Figure 11G:
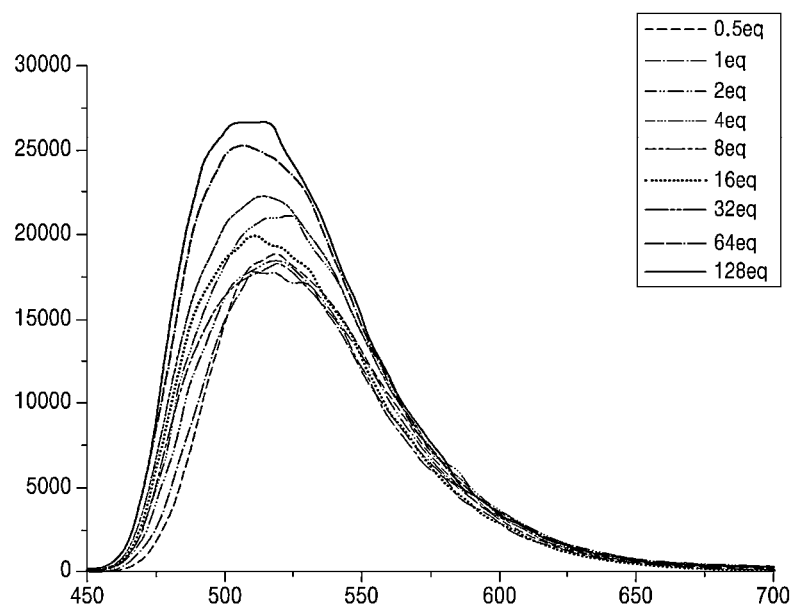
Figure 11H:
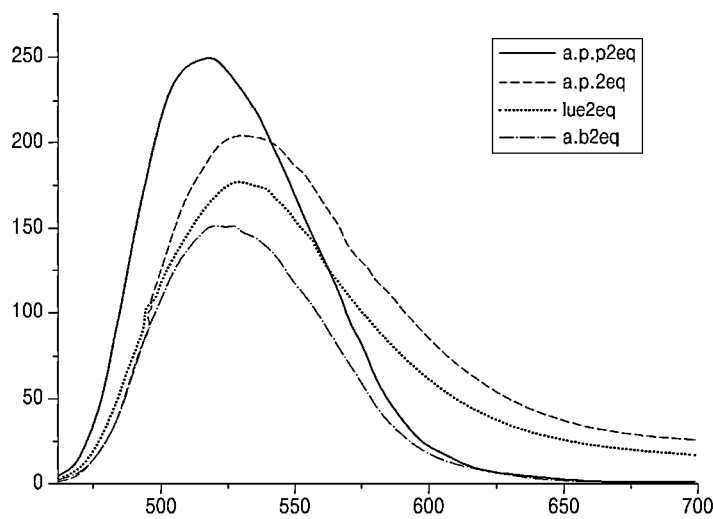
Figure 12A:
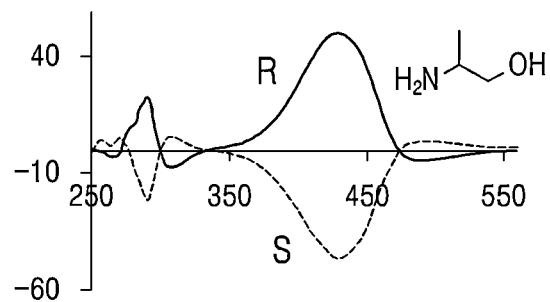
FIGS. 12A to 12F show CD spectra results in cases of mixing compound 1 and aminoalcohol of excess amount respectively: compound 1+alaninol (FIG. 12A) compound 1+aminobutanol (FIG. 12B), compound 1+valinol (FIG. 12C) compound 1+leucinol (FIG. 12D) compound 1+phenylalaninol (FIG. 12E), and compound 1+tryptopanol (FIG. 12F).
Figure 12B:
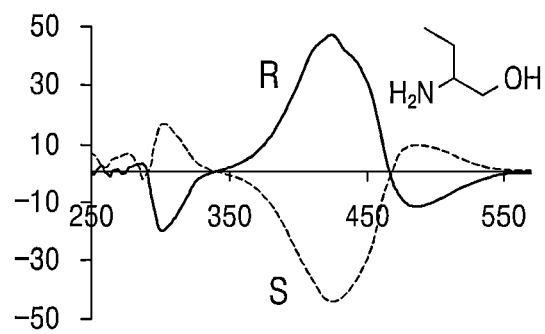
Figure 12C:
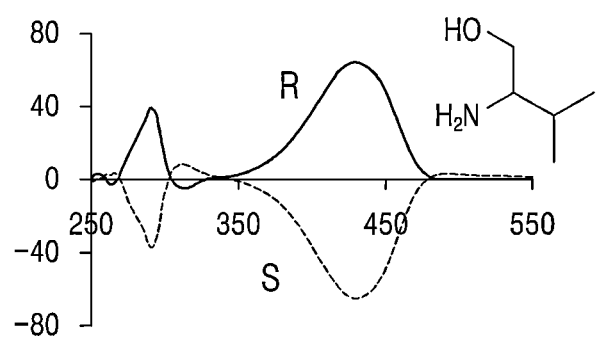
Figure 12D:
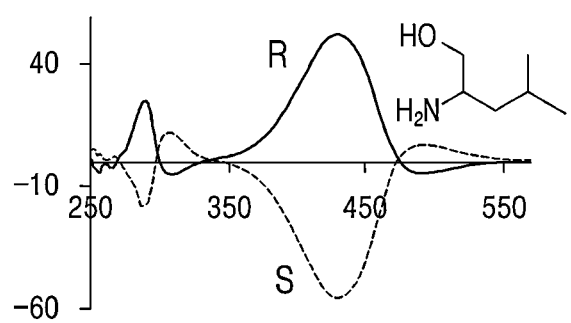
Figure 12E:
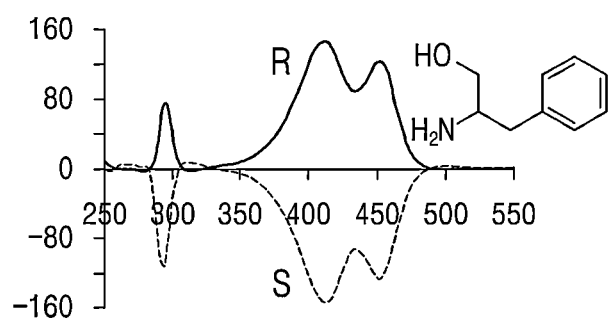
Figure 12F:
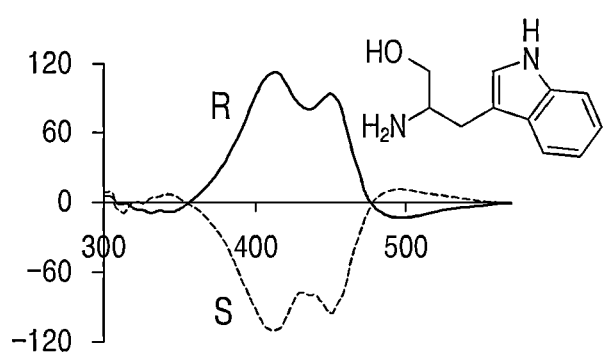
Figure 13A:
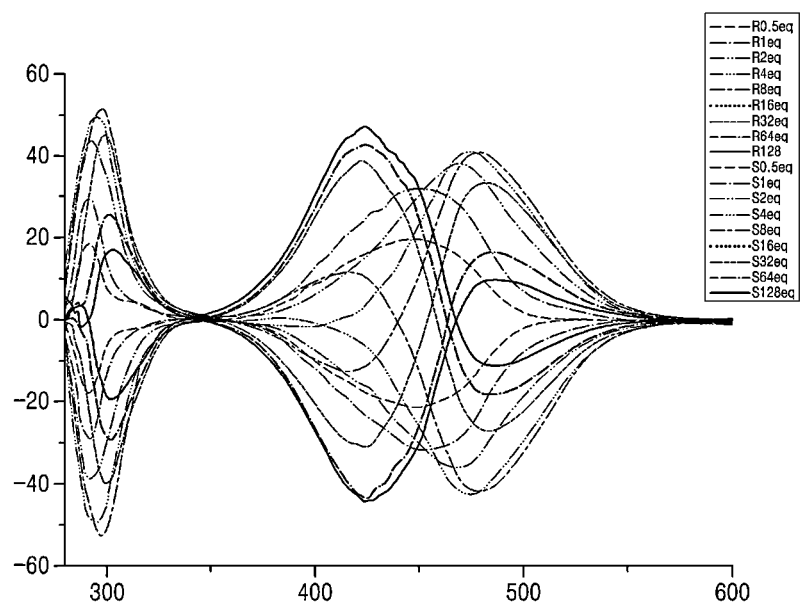
FIGS. 13A to 13F show CD changes of compound 1+alaninol (FIG. 13A), compound 1+phenylalaninol (FIG. 13B), compound 1+aminobutanol (FIG. 13C), compound 1+valinol (FIG. 13D), compound 1+leucinol (FIG. 13E), and compound 1+tryptophanol (FIG. 13F), respectively, when compound 1 is used as a probe in accordance with an example of the present disclosure.
Figure 13B:
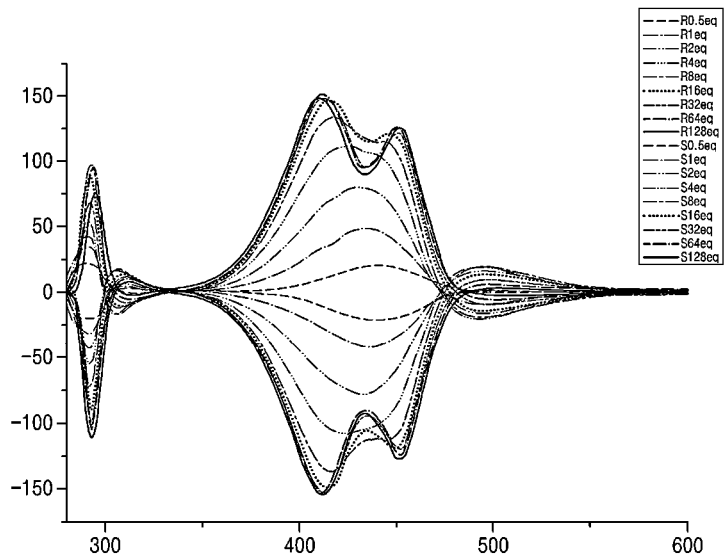
Figure 13C:
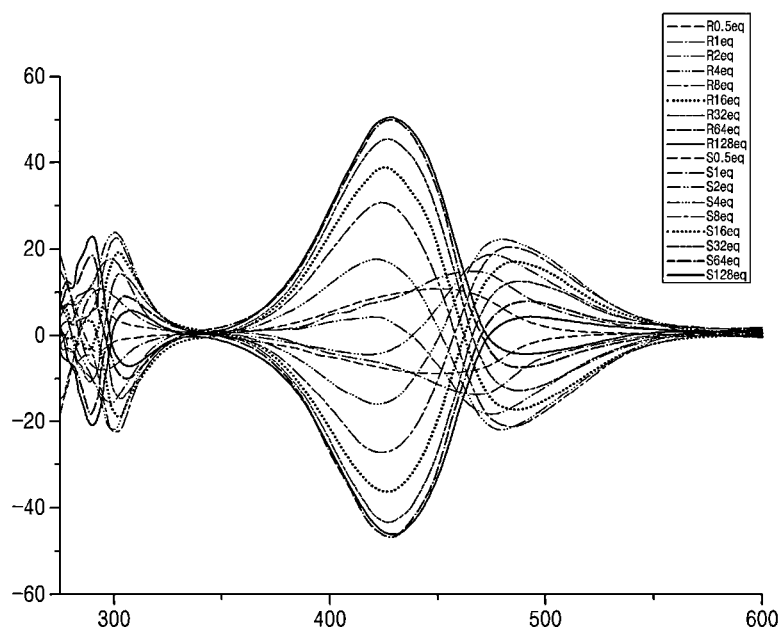
Figure 13D:
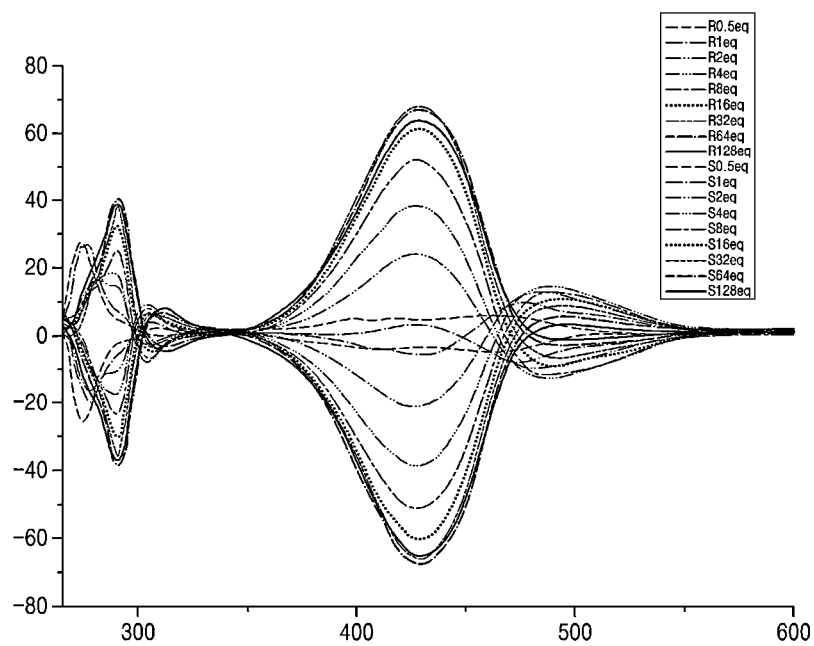
Figure 13E:
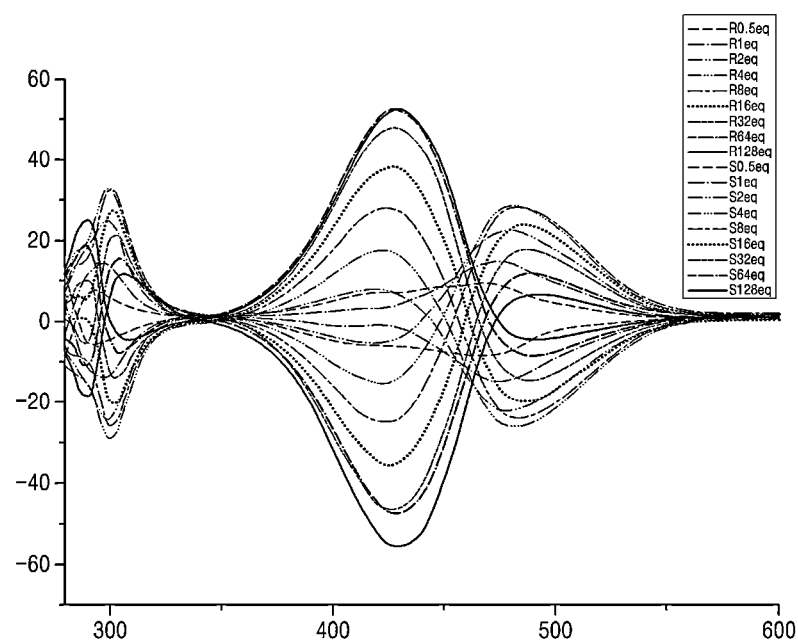
Figure 13F:
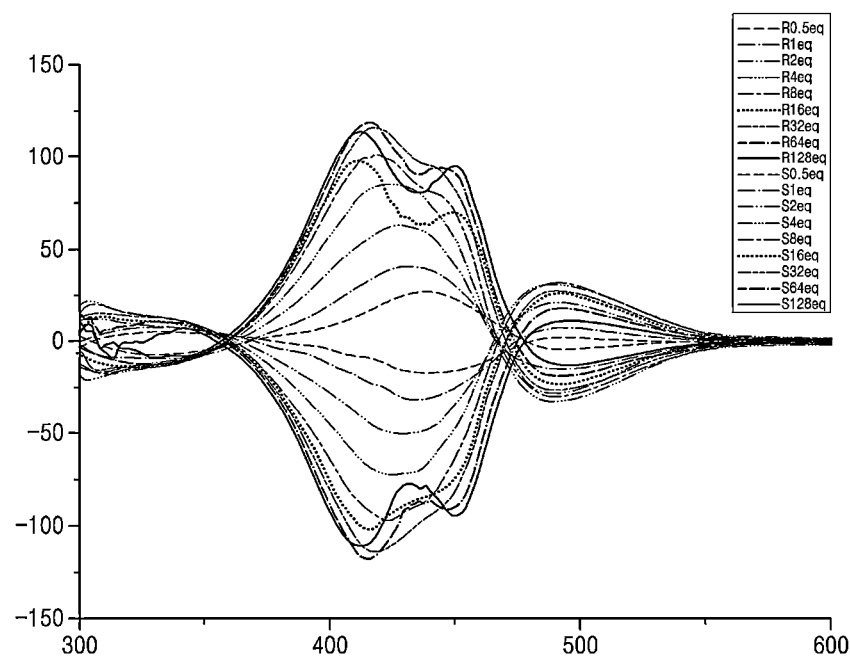

Next, the fluorescence spectra according to the equivalents of compound 1 and various aminoalcohols were confirmed (Instrument: Scinco FS-2, the concentration of compound 1: 1.5 mM). Referring to fluorescence spectrum of FIG. 11A to FIG. 11H, various changes of fluorescence spectra according to various aminoalcohols when compound 1 is used as probe: (FIG. 11A) compound 1+ethanolamine, (FIG. 11B) compound 1+alaninol, (FIG. 11C) compound 1+phenylalaninol, (FIG. 11D) compound 1+aminobutanol, (FIG. 11E) compound 1+valinol, (FIG. 11F) compound 1+leucinol, (FIG. 11G) compound 1+tryptophanol, (FIG. 11H) comparative (compound 1+alainol (a.p), leucenol (leu), aminobutanol (a.b), phenylalaninol (a.p.p))

Example 9: Analysis Results of CD Spectrum of the Product of Compound 1 and Aminoalcohols As an analysis result of CD spectrum upon excess addition of alaninol, aminobutanol, valinol, leucenol, phenylalaninol and tryptopanol to compound 1 solution, different and characteristic patterns emerge according to the functional groups of aminoalcohols (FIG. 12A to FIG. 12F). These unique CD patterns can be used as a fingerprint for each aminoalcohol, allowing for sensing the identity and chirality.

Next, the CD spectra according to the equivalents of compound 1 and various aminoalcohols were confirmed (Instrument: Jasco-J-1500, the concentration of compound 1: 1.5 mM). Referring to CD spectra of FIG. 13A to FIG. 13F various changes of CD spectra according to the various aminoalcohols when compound 1 is used as probe: (FIG. 13A) compound 1+alaninol, (FIG. 13B) compound 1+phenylalaninol, (FIG. 13C) compound 1+aminobutanol, (FIG. 13D) compound 1+valinol, (FIG. 13E) compound 1+leucinol, (FIG. 13F) compound 1+tryptophanol.

Figure 14A:
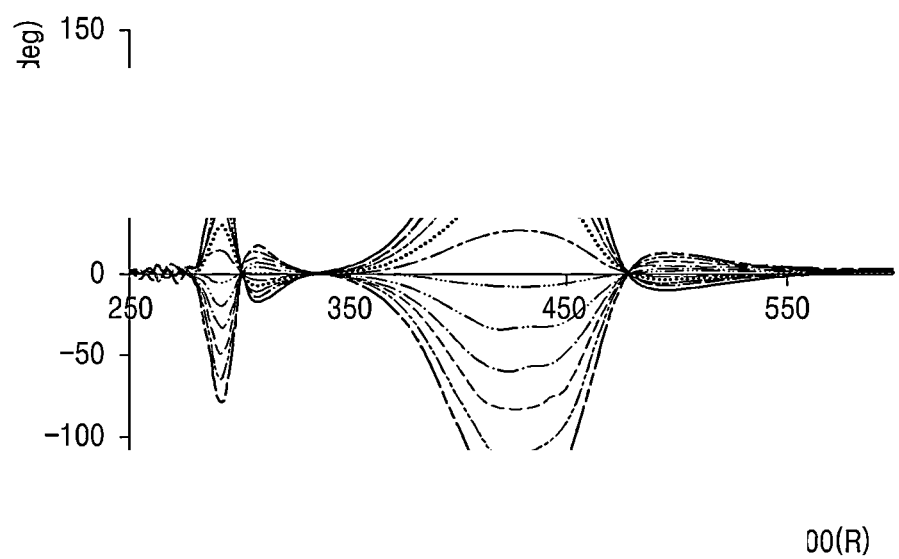
FIG. 14A shows CD spectra for mixing PANL and compound 1 according to various % ee (concentration of compound 1: 1.5 mM, $CH_2Cl_2$, 10 mm cell, 20° C.), and FIG. 14B indicates % ee of CD and PANL by linear plots, in accordance with an example of the present disclosure.
Figure 14B:
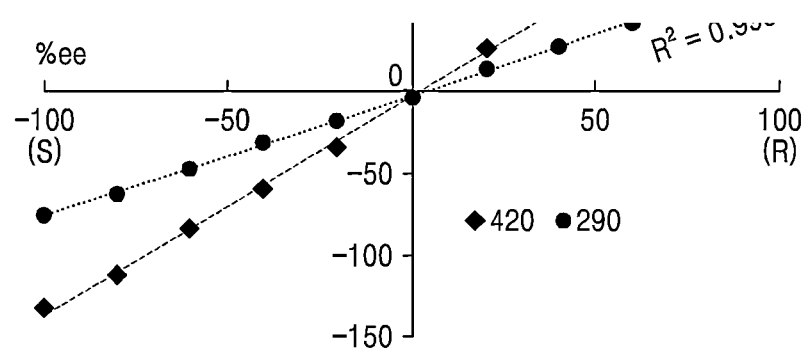

Further, correlation of the CD spectrum with the enantiomeric excess (ee) of PANL was confirmed. FIG. 14 shows a good linear correlation of the CD spectrum with the ee of PANL. Based on the above results, compound 1 and aminoalcohols exhibit CD spectra and the CD signals have a linear correlation with % ee of aminoalcohols, and thus, optical purity can be measured using compound 1 as a probe.

Therefore, we can determine both of the concentration and the % ee value of an arbitrary aminoalcohol from the CD data and the fluorescence data using compound 1 as a single probe.

Specifically, as an example for phenylalaninol, the fluorescence intensities are compared at the wavelength of 500 nm (FIG. 11C), CD intensities at 410 nm (FIG. 13B), and the (−) intensities indicate (S)-form excesses. The following Table 1 can be derived from the intensities of fluorescence and CD, and intensities of fluorescence and CD in Table 1 can be represented by % ratio of measured values ($I_f$ and $I_{CD}$) over maximum values ($I_{f,max}$ and $I_{CD,max}$).

TABLE 1

| Fl. intensity $(100 \times I_f/I_{f,max})$ | Conc. of PANL (mM) | CD intensity $(100 \times I_{CD}/I_{CD,max})$ | | | | | | | | | | |
|---|---|---|---|---|---|---|---|---|---|---|---|---|
| | | ee 100% | ee 90% | ee 60% | ee 40% | ee 20% | ee 0% | ee −20% | ee −40% | ee −60% | ee −80% | ee −100% |
| 0 | 0 | 0 | 0 | 0 | 0 | 0 | 0 | 0 | 0 | 0 | 0 | 0 |
| 20 | 0.5 | 6 | 4.8 | 3.6 | 2 | 1 | 0 | −1 | −2 | −3.6 | −4.8 | −6 |
| 40 | 1 | 10 | 8 | 6 | 4 | 2 | 0 | −2 | −4 | −6 | −8 | −10 |
| 60 | 12 | 87 | 70 | 52 | 35 | 17.5 | 0 | −17.5 | −35 | −52 | −70 | −87 |
| 80 | 20 | 94 | 75 | 56 | 37 | 19 | 0 | −19 | −37 | −56 | −75 | −94 |
| 100 | >90 | 100 | 80 | 60 | 40 | 20 | 0 | −20 | −40 | −60 | −80 | −100 |

As another example for alaninol, the fluorescence intensities are compared at the wavelength of 510 nm (FIG. 11B), CD intensities at 410 nm (FIG. 13A), and the (−) intensities indicate (S)-form excesses. The following Table 2 can be derived from the intensities of fluorescence and CD, and intensities of fluorescence and CD in Table 2 can be represented by % ratio of measured values ($I_f$ and $I_{CD}$) over maximum values ($I_{f,max}$ and $I_{CD,max}$).

TABLE 2

| Fl. intensity ($100 \times I_f/I_{f,max}$) | Conc. Of PANL (mM) | CD intensity ($100 \times I_{CD}/I_{CD,max}$) | | | | | | | | | | |
|---|---|---|---|---|---|---|---|---|---|---|---|---|
| | | ee 100% | ee 90% | ee 60% | ee 40% | ee 20% | ee 0% | ee −20% | ee −40% | ee −60% | ee −80% | ee −100% |
| 0 | 0 | 0 | 0 | 0 | 0 | 0 | 0 | 0 | 0 | 0 | 0 | 0 |
| 20 | 4.5 | 30 | 24 | 18 | 12 | 6 | 0 | −6 | −12 | −18 | −24 | −30 |
| 40 | 12 | 24 | 48 | 36 | 24 | 12 | 0 | −2 | −24 | −36 | −48 | −60 |
| 60 | 24 | 56 | 45 | 34 | 22 | 11 | 0 | −11 | −22 | −34 | −45 | −56 |
| 80 | 60 | 78 | 62 | 47 | 31 | 16 | 0 | −16 | −31 | −47 | −62 | −78 |
| 100 | >190 | 100 | 80 | 60 | 40 | 20 | 0 | −20 | −40 | −60 | −80 | −100 |

In conclusion, compound 1 as a representative example based on the above Examples is a probe that gives both CD and fluorescence signals upon the presence of aminoalcohols, allowing for convenient sensing of even aliphatic aminoalcohols which do not have any chromophores.

The principle of the probe is due to the rapid formation of ketimine bonds, which can be explained by the intermolecular reaction by fixing of the hydroxyl group of the boric acid moiety in the probe to promote subsequent amine-carbonyl condensation reaction.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A compound represented by the following Chemical Formula 1:

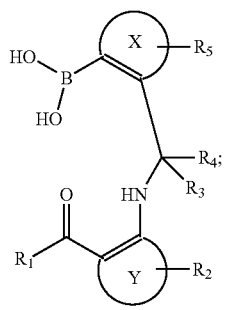

[Chemical Formula 1]

wherein $R_1$ is selected from the group consisting of hydrogen; amino; and a $C_{1-10}$ alkyl, a $C_{6-10}$ aryl, and a $C_{1-10}$ alkoxy that is unsubstituted or substituted with at least one substituent selected from the group consisting of a halogen, hydroxy, amino, cyano, nitro, and a $C_{6-10}$ aryl;

each of $R_3$ and $R_4$ is independently selected from the group consisting of hydrogen; a halogen; and a $C_{1-10}$ alkyl, a $C_{6-10}$ aryl, and a $C_{1-10}$ alkoxy that is unsubstituted or substituted with at least one substituent selected from the group consisting of a halogen, hydroxy, amino, cyano, nitro, and a $C_{6-10}$ aryl;

each of $R_2$ and $R_5$ is independently selected from the group consisting of hydrogen; a halogen; amino; nitro; cyano; and a $C_{1-10}$ alkyl, a $C_{6-10}$ aryl, and a $C_{1-10}$ alkoxy that is unsubstituted or substituted with at least one substituent selected from the group consisting of a halogen, hydroxy, amino, cyano, nitro, and a $C_{6-10}$ aryl;

X is a $C_{6-10}$ aryl group, or a $C_{2-10}$ heteroaryl group including at least one hetero atom selected from O, N, S, Si, and P; and Y is a $C_{6-10}$ aryl group.

2. The compound of claim 1, wherein the compound is represented by the following Chemical Formula 2:

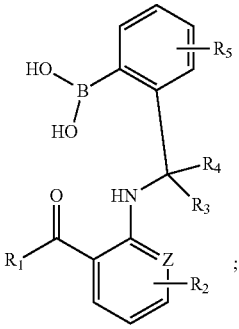

[Chemical Formula 2]

wherein Z is CH.

3. The compound of claim 1, wherein the compound is

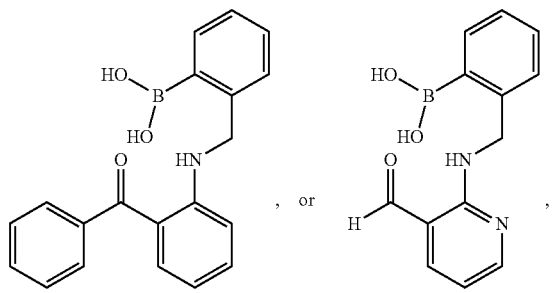 [SMILES: O=C(c1ccccc1)c1ccccc1NCc1ccccc1B(O)O ; O=Cc1cccnc1NCc1ccccc1B(O)O], or

4. A probe comprising the compound according to claim 1,
wherein the probe is configured to react with an aminoalcohol compound to form an adduct such that a concentration and an optical purity of the aminoalcohol compound are obtained by measuring a circular dichroism (CD) signal and a fluorescence signal of the adduct.

5. A probe comprising the compound according to claim 1,
wherein the probe is configured to react with an aminoalcohol compound to form an adduct having a fluorescent chromophore that comprises a hetero ring having a N—B—N subunit, and
wherein a concentration and an optical purity of the aminoalcohol compound are obtainable by measuring a circular dichroism (CD) signal and a fluorescence signal of the adduct.

6. An analysis method using the compound of claim 1 as a probe compound, the method comprising:
reacting the probe compound with an aminoalcohol compound to form an adduct, and
obtaining a concentration of the aminoalcohol compound by measuring a fluorescence signal of the adduct.

7. The analysis method of claim 6, wherein the aminoalcohol compound is selected from compounds represented by the following Chemical Formulas:

8. An analysis method using the compound of claim 1 as a probe compound, the method comprising:
reacting the probe compound with an aminoalcohol compound to form an adduct, and
obtaining a concentration and an optical purity of the aminoalcohol compound
by measuring a CD signal and a fluorescence signal of the adduct.

9. The analysis method of claim 8,
wherein the adduct comprises a fluorescent chromophore having a hetero ring with a N—B—N subunit.

10. The analysis method of claim 9,
wherein fluorescence and circular dichroism (CD) are analyzed individually or simultaneously by using the fluorescent chromophore.

11. The analysis method of claim 8,
wherein the aminoalcohol compound is selected from compounds represented by the following Chemical Formulas:

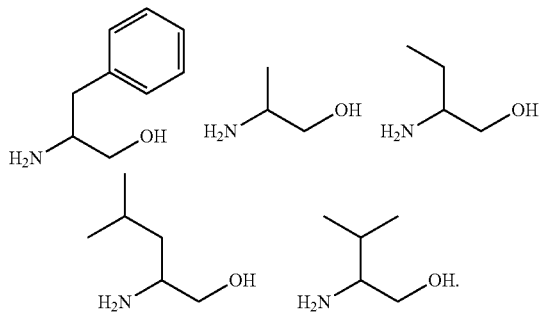

12. The analysis method of claim 8, wherein the aminoalcohol compound is a compound represented by the following Chemical Formula:

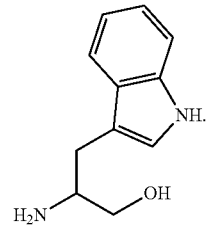

* * * * *